United States Patent
Takazawa

Patent Number: 5,898,439
Date of Patent: Apr. 27, 1999

[54] METHOD AND APPARATUS FOR DRAWING CHARACTERS WHICH DRAWS CURVED SEGMENTS BASED ON APPROXIMATE POINTS

[75] Inventor: Masahiro Takazawa, Yokohama, Japan

[73] Assignee: Fujitsu Limited, Kawasaki, Japan

[21] Appl. No.: 08/561,277

[22] Filed: Nov. 21, 1995

[30] Foreign Application Priority Data

Nov. 21, 1994 [JP] Japan ................................. 6-286204

[51] Int. Cl.$^6$ ........................................... G06T 11/00
[52] U.S. Cl. ........................ 345/441; 345/467; 345/471
[58] Field of Search ............................... 395/167–1, 172, 395/141–143; 382/177, 241, 242; 345/467–472, 441–443

[56] References Cited

U.S. PATENT DOCUMENTS

| 5,404,428 | 4/1995 | Wu .................................. 395/120 X |
| 5,596,689 | 1/1997 | Tamura et al. .......................... 395/133 |

FOREIGN PATENT DOCUMENTS 1-185596  7/1989  Japan .

Primary Examiner—Almis R. Jankus

[57] ABSTRACT

An outline font dictionary contains outline font data indicative of outlines of characters to be drawn by a drawing output device such as a display device or a printing device. Each of the outlines is divided into a plurality of outline sections which are defined by a plurality of element structures, respectively, formed from the outline font data read out from the outline font dictionary. When the outline font data read out from the outline font dictionary is indicative of continuous outline sections each forming a rectilinear segment, a polygonal line element structure is formed from the read out outline font data. Based on the polygonal line element structure, the continuous outline sections each forming the rectilinear segment are drawn as a polygonal line by the drawing output device. When, on the other hand, the outline font data read out from the outline font dictionary is indicative of a outline section forming a curved segment, a plurality of approximate points positioned on the curved segment are specified. Based on the specified approximate points, there is formed a polygonal line element structure on the basis of which the outline section is drawn as a polygonal line by the drawing output device. As a consequence, the element structures used to draw the characters are reduced in number when the outlines of the characters includes the continuous rectilinear segments or a curved segment.

23 Claims, 19 Drawing Sheets

FIG.1
PROR ART

| DRAWING POINT MOVEMENT OPERATOR |
|---|
| 0 (X-COORDINATE) |
| 100 (y-COORDINATE) |
| SLANTINDICULAR RECTILINEAR SEGMENT DRAWING OPERATOR (ABSOLUTE COORDINATE TYPE) |
| 100 (X-COORDINATE) |
| 200 (y-COORDINATE) |
| HORIZONTAL RECTILINEAR SEGMENT DRAWING OPERATOR (ABSOLUTE COORDINATE TYPE) |
| 150 (x-COORDINATE) |
| VERTICAL RECTILINEAR SEGMENT DRAWING OPERATOR (RELATIVE COORDINATE TYPE) |
| -200 (y-COORDINATE) |
| HORIZONTAL RECTILINEAR SEGMENT DRAWING OPERATOR (RELATIVE COORDINATE TYPE) |
| -50 (x-DISPLACEMENT) |
| CURVED SEGMENT DRAWING OPERATOR |
| 50 (x-COORDINATE) |
| 0 (y-COORDINATE) |
| 0 (x-COORDINATE) |
| 50 (y-COORDINATE) |
| 0 (x-COORDINATE) |
| 100 (y-COORDINATE) |
| OUTLINE DATA ENDING OPERATOR |

DG1, DG2, DG3, DG4, DG5, DG6, DG7

METHOD AND APPARATUS FOR DRAWING CHARACTERS WHICH DRAWS CURVED SEGMENTS BASED ON APPROXIMATE POINTS

BACKGROUND OF THE INVENTION

1. Field of the Invention

The present invention relates to a method and an apparatus for processing outline font data indicative of outlines of characters and, more particularly to the improvement in forming element structures based on the outline font data and used for drawing of the characters on a display screen or a paper.

2. Description of the Related Art

In recent years, the use of word processors and computers such as a personal computers executing a word processing application has grown and developed remarkably. Such word processors or computers make it possible to create a presentable document with ease and, as a consequence, not only formal documents such as contracts exchanged between corporations but also personal documents such as letters privately exchanged are created in general with the aid of the word processor or computer.

In creating a manuscript, a writer can draw characters of favorite size and design and cause the characters to reflect the writer's personality with ease. On the other hand, when creating a document with the aid of an outmoded word processor or personal computer, the writer can hardly cause the characters to reflect the writer's personality because of the fact that such a word processor or personal computer provides only a few character sets of predetermined size and design for the writer. The recent growth and development of the computer technology, however, enables the word processor or personal computer to provide a wide variety of character sets for the writer.

The sets of characters drawn through the word processor or computer are generally called "fonts" and are classified into bit map font groups and outline font groups in accordance with their own data structure and data processing technique. The fonts are stored in a storage device such as a hard disk or ROM (Read-only Memory).

Each of the characters of a bit map font is represented by plural bunches of dots each corresponding to each of picture elements provided for a drawing output device such as a display device or printing device and, accordingly, the finesse of the bit map font depends upon the resolution of the drawing output device. Provided that bit map font data of appropriate character sizes is stored in the storage device of the word processor or personal computer, fine characters can be drawn extremely quickly by the drawing output device or printing device on a screen or on paper. The reason for this is that the process of displaying or printing out the bit map font requires no complicated calculation by the drawing output device or computer. If, however, the character is enlarged with respect to the original character size and displayed or printed out, the outlines of the characters become jagged. This means that the characters have reduced drawing quality and, as a consequence, that the bit map font is unsuitable to change the character size.

On the other hand, the outline font is suitable to change the character size and has been frequently used in recent years. In general, each of the characters of the outline font is formed by drawing the outlines of the character and painting regions surrounded by the outlines. If, therefore, the, character is enlarged with respect to the original character size and displayed or printed out, the outlines of the characters are prevented from becoming jagged. Data indicative of the outline font are contained in a outline font dictionary stored in the storage device. The characters of the outline font are drawn by a display or printing device after the outline font data is processed in a manner described as follows.

FIG. 1 shows in part an example of the outline font dictionary containing the outline font data and stored in a storage device. The outline font dictionary is formed on the assumption that each of the outlines of the characters is divided into a plurality of outline sections which are drawn in turn to form the outline in a dictionary coordinate system of the outline font dictionary. The dictionary coordinate system is defined by x-axis and y-axis intersecting each other at a right angle and extending horizontally and vertically, respectively. The outline font dictionary partly shown in FIG. 1 comprises drawing data groups DG1 to DG7 on the basis of which an outline shown in FIG. 2 is drawn in the dictionary coordinate system. The drawing data group DG1 comprises a drawing point movement operator indicating that a drawing point provided for the dictionary coordinate system is moved from the origin to a destination point in the dictionary coordinate system without drawing, and a coordinate data set representative of an absolute x-coordinate and an absolute y-coordinate, i.e., coordinates (0, 100) of the destination point in the dictionary coordinate system. The drawing data group DG2 comprises a rectilinear segment drawing operator of an absolute coordinate type indicating the drawing point is moved on a slanted straight line from the current point to a destination point in the dictionary coordinate system to draw a slantindicular rectilinear segment, and a coordinate data set representative of absolute coordinates (100, 200) of the destination point in the dictionary coordinate system. The drawing data group DG3 comprises a horizontal rectilinear segment drawing operator of an absolute coordinate type indicating that the drawing point is horizontally moved on a straight line from the current point to a destination point in the dictionary coordinate system to draw a horizontal rectilinear segment, and a coordinate data set representative of absolute x-coordinate (150) of the destination point in the dictionary coordinate system. The drawing data group DG4 comprises a vertical rectilinear segment drawing operator of a relative coordinate type indicating that the drawing point is vertically moved on a straight line from the current point to a destination point to draw a vertical rectilinear segment, and a coordinate data set representative of relative y-coordinate (−200) of the destination point with respect to the current point in the dictionary coordinate system. The drawing data group DG5 comprises a horizontal rectilinear segment drawing operator of a relative coordinate type indicating that the drawing point is horizontally moved on a straight line from the current point to a destination point to draw a horizontal rectilinear segment, and a coordinate data set representative of relative x-coordinate (−50) of the destination point in the dictionary coordinate system. The drawing data group DG6 comprises a curved segment drawing operator indicating that the drawing point is moved on a curved line from the current point to a destination point to draw a curved segment, and three coordinated data sets representative of absolute coordinates (50, 0), (0, 50) and (0, 100) of three control points, respectively, which define the curved segment in cooperation with the current point. The drawing data group DG7 comprises an outline data ending operator indicating the ending of an outline partly forming the outlines of the character.

On the basis of the drawing data groups DG1 through DG7 shown in FIG. 1, there is drawn an outline which forms part of a character and consists of rectilinear segments LS2-LS5 and a curved segment CS6 shown in FIG. 2. Firstly, based on the drawing data group DG1, the drawing point is vertically moved straight from the origin of the coordinates (0, 0) to a first destination point D1 of the coordinates (0, 100) without drawing. Based on the drawing data group DG 2, the drawing point is moved on a slanted straight line from the first point D1 of the coordinates (0, 100) to a second point D2 of the coordinates (100, 200) to draw a slantindicular rectilinear segment LS2. Based on the drawing data group DG3, the drawing point is horizontally moved on a straight line from the second point D2 of the coordinates (100, 200) to a third point D3 of the coordinates (150, 200) to draw a horizontal rectilinear segment LS3. Based on the drawing data group DG4, the drawing point is vertically moved on a straight line from the third point D3 of the coordinates (150, 200) to a fourth point D4 of the coordinates (150, 0) to draw a vertical rectilinear segment LS4. Based on the drawing data group DG5, the drawing point is horizontally moved on a straight line from the fourth point DG4 of the coordinates (150, 0) to a fifth point D5 of the coordinates (100, 0) to draw a horizontal rectilinear segment LS5. Based on the drawing data group DG6, the drawing point is moved on a curved line from the fifth point D5 of the coordinates (100, 0) to the first point D1 of the coordinates (100, 0) to draw a curved segment CS6. A series of drawing operations set forth above is terminated by the drawing data group DG7 and, thus, the outline of the character is completed. It should be kept in mind that the outline shown in FIG. 2 represents a simple figure and has been selected in order to simplify the description. The outline is not included in the outline of a character actually put to use. As will be understood from the foregoing description and FIGS. 1 and 2, the divided outline sections are defined by the drawing data groups DG2 through DG6, respectively. The curved segment based on the drawing data group DG6 is a so-called Bézier cubic curve which is a cubic spline approximation to a set of four control points. In FIG. 2, the four control points correspond to points D5, D61, D62 and D63(=D1), respectively. The curved segment passes through the points D5 and D63 and has a shape that is specified by the position of the points D61 and D62 with respect to the points D5 and D63.

In practical drawing operation, after the outline font data are read out from the outline font dictionary, the read outline font data are processed as described below and stored in a storage device for a short time. The outline font is drawn in accordance with the processed data read out from the storage device. The processing technique will be described in detail hereinafter with reference to FIGS. 3–6. A conventional outline font data processing system is shown in FIG. 3 as comprising a path constructing unit 100, a font drawing unit 150 and a common storage unit 140 referred to by the path constructing unit 100 and the font drawing unit 150 without discrimination.

The path constructing unit 100 comprises a dispatching unit 101, drawing point movement data processing unit 102, a rectilinear segment drawing data processing unit 103, a horizontal rectilinear segment drawing data processing unit 104, a vertical rectilinear segment drawing data processing unit 105, a curved segment drawing data processing unit 106 and an outline ending data processing unit 107. Upon receiving an instruction to draw a character from a control unit 120, the path constructing unit 100 reads out outline font data corresponding to the character from an outline font dictionary 130. The outline font data read out from the outline font dictionary 130 are judged as to the operator type by the dispatching unit 101. If the read outline font data is of a drawing point movement operator type, the read out outline font data are transferred to the drawing point movement data processing unit 102. If the data is of a rectilinear segment drawing operator type; the read out outline font data are transferred to the rectilinear segment drawing data processing unit 103. If the data is of a horizontal rectilinear segment drawing operator type, the read out outline font data are transferred to the horizontal rectilinear segment drawing data processing unit 104. If the data is of a vertical rectilinear segment drawing operator type, the read out outline font data are transferred to the vertical rectilinear segment drawing data processing unit 105. If the data is of a curved segment drawing operator type, the read out outline font data are transferred to the curved segment drawing data processing unit 106. If the data is of an outline data ending operator type, the read out outline font data are transferred to the outline ending data processing unit 107. In the data processing units 102–107, element structures are formed in accordance with the transferred outline font data and stored in a memory area previously reserved on the common storage unit 140. The element structures thus formed are connected in serial, thereby to construct a graphic path. Each of the element structures comprises a pointer indicative of a location of the following element structure, element type data representative of an element type of each of the element structures, a coordinate data set indicative of coordinates of a destination point in a drawing coordinate system provided for the drawing output device such as a display or printing device.

When drawing data groups A, B and C are read out by the path constructing unit 100 from the outline font dictionary 130 shown in FIG. 3, the drawing data group A is transferred to the drawing point movement data processing unit 102. On the other hand, the drawing data groups B and C are transferred to the rectilinear segment drawing data processing unit 103. The drawing point movement data processing unit 102 processes the drawing data group A to form a drawing point movement element structure A' shown in FIG. 3, while the rectilinear segment drawing data processing unit 103 processes the drawing data groups B and C to form rectilinear segment element structures B' and C' shown in FIG. 3, respectively.

The process of forming the rectilinear segment element structure B' will be described, by way of example, hereinafter. The procedure by the rectilinear segment drawing data processing unit 103 is shown in FIG. 4 as comprising three steps. In the first step, the coordinates (x2, y2) of the drawing data group B in the dictionary coordinate system are mapped onto the drawing output device coordinate system, so that coordinates (x'2, y'2) in the drawing output device coordinate system can be obtained. At the second step, a memory area on the common storage unit 140 is reserved for the rectilinear segment element structure B' and, afterwards, the rectilinear segment element structure B' is formed and stored in the reserved memory area. The element type data of the rectilinear segment element structure B' are set as indicating a rectilinear segment. The obtained coordinates (x'2, y'2) are substituted for coordinates (x, y) of the coordinate data set of the rectilinear segment element structure B'. At the third step, the rectilinear segment element structure B' is connected to the graphic path by substituting the address of the rectilinear segment element structure B' for the pointer of the drawing point movement element structure A'. The drawing point movement element structure A' and the rectilinear segment element structure C' are formed in a similar manner. The element type data of the drawing point movement element structure A' are set as indicating the movement of the drawing point. The coordinates (x'1, y'1) of the drawing movement element structure A' and the coordinates (x'3, y'3) of the rectilinear segment element structure C' are obtained by mapping the coordinates (x1, y1) of the drawing data group A and the coordinates (x3, y3) of the drawing data group C onto the drawing output device coordinate system, respectively. The horizontal and vertical rectilinear segment drawing data processing units 104 and 105 also process the outline font data in a similar manner.

On the other hand, another data processing technique applied to the curved segment drawing data processing unit 106 differs from the foregoing technique in specifying a plurality of approximate points positioned on and approximately defining a curved segment before an element structure forming step. As described above, the curved segment is Bézier cubic curve defined by the four control points including the current drawing point and, for this reason, the drawing data group indicative of the curved segment and contained in the outline font dictionary comprises three coordinate data sets respectively having coordinates of the three control points in the dictionary coordinate system.

The processing technique used by the curved segment drawing data processing unit 106 will be described hereinafter with reference to FIG. 5.

When the drawing data group indicative of the curved segment are read out by the path constructing unit 100 from the outline font dictionary 130, the coordinates of three points included in the read out drawing data group are mapped onto the drawing output device coordinate system in a step P1, thereby obtaining three coordinate data sets indicative of the three control points in the drawing output device coordinate system. At this time, the coordinates of four control points to be used for defining the curved segment in the drawing output device coordinate system are obtained because of the fact that coordinates of the current drawing point are identical with coordinates contained in the latest one of the previously formed element structures. The step P1 is followed by a step P2 in which coordinates of an approximate point following the current drawing point are specified. The step P2 proceeds to a step P3 to determine whether or not the specification of approximate points was completed. If the answer in the step P3 is in the negative "NO", the step P3 proceeds to a step P4 in which a memory area is reserved for a rectilinear segment element structure on the common storage unit 140. In a step P5, a first rectilinear segment element structure K shown in FIG. 6 are formed and stored in the reserved memory area of the common storage unit 140. The rectilinear segment element structure K indicates that the drawing point is moved on a straight line from the current point to the specified approximate point to draw a rectilinear segment approximately forming the curved segment in part. The element structure K is so constructed as to include coordinates (x'1, y'1) defining the first approximate point in the drawing output device coordinate system. The step P5 is followed by a step P6 to substitute the address of the rectilinear segment element structure K for a pointer of a previously formed element structure (not shown) and, as a consequence, the rectilinear segment element structure K is connected to a previously formed graphic path. The steps P2 through P6 are repeated until the rectilinear segment element structures respectively based on all the approximate points have been formed and connected to the graphic path. The graphic path thus constructed is shown in FIG. 6 as comprising the second and third rectilinear segment element structures L and M which indicate that a rectilinear segment is drawn so as to extend rectilinearly from the first approximate point to the second approximate point, and that a rectilinear segment is draw so as to extend rectilinearly from the second approximate point to the third approximate point, respectively.

The element structures thus formed by path constructing unit 100 collectively define the outlines of the character designated by the control unit 120 in the drawing coordinate system. When the control unit 120 sends a paint operator to the font drawing unit 150 by way of the path constructing unit 100, the font drawing unit 150 reads out the graphic path from the common storage unit 140 and then instructs the drawing output device to draw the character designated by the control unit 120, thereby displaying the character on a screen or printing the character on a paper.

Drawbacks are, however, encountered in the step of forming the element structures indicating the continuous rectilinear segments, adapted for such a prior art outline data processing system. One of the drawbacks is that the numbers of memory area reservations for the rectilinear segment element structures is increased when the outline is divided into numerous continuous rectilinear segments in part. The reason for this is that the rectilinear segment element structures are equal in number to the continuous rectilinear segments. The same reason results in another drawback in that the total size of the reserved memory areas are increased. A further drawback is that the font drawing unit takes a long time to draw the continuous rectilinear segments inasmuch as the font drawing unit is required to read out the numerous rectilinear segment element structures in order to draw the continuous rectilinear segments.

Likewise, drawbacks are encountered in the step of forming the element structures indicating a curved segment, adapted for such a prior art outline data processing system. One of the drawbacks is that the number of memory area reservations for the rectilinear segment element structures is increased because of the fact that the curved segment is approximately drawn by numerous short rectilinear segments to be indicated by the rectilinear segment element structures. The same reason results in another drawback in that the total size of the reserved memory areas is increased. A further drawback is that the font drawing unit must take long time out to draw the curved segment inasmuch as the font drawing unit is required to read out the numerous rectilinear segment element structures in order to draw the curved segment.

SUMMARY OF THE INVENTION

It is an object of the present invention to reduce the number of element structures collectively forming a graphic path and accordingly to reduce, in number, the reservations of memory areas for the element structures, respectively.

It is another object of the present invention to reduce the total size of the memory areas storing the graphic path therein.

It is a further object of the present invention to speed up and simplify the drawing operation of a character after the construction of the graphic path.

In accordance with an aspect of the present invention, an outline font data processing method is provided in which an outline font dictionary contains outline font data indicative of outlines of characters drawn by a drawing output device. The outline font data processing method comprises a step of reading out, from the outline font dictionary, the outline font data indicative of one of the characters, and a step of constructing a graphic path covering the whole of the outlines of the one of the characters by forming a plurality of element structures based on the outline font data read out from the outline font dictionary and by connecting the element structures. Each of the outlines indicated by the read out outline font data is divided into a plurality of outline sections. The constructing step includes steps of judging whether or not each of the outline sections is a rectilinear segment and forming, from the outline font data indicative of the continuous outline sections each forming a rectilinear segment, a polygonal line element structure indicative of a continuous outline section drawn as a polygonal line by the drawing output device. The constructing step further includes a step of connecting the polygonal line element structure to the graphic path.

In accordance with another aspect of the present invention, an outline font data processing method is provided in which an outline font dictionary contains outline font data indicative of outlines of characters drawn by a drawing output device. The outline font data processing method comprises a step of reading out, from the outline font dictionary, the outline font data indicative of one of the characters, and a step of constructing a graphic path covering the whole of the outlines of the one of the characters by forming a plurality of element structures based on the outline font data read out from the outline font dictionary and by connecting the element structures. Each of the outlines indicated by the read outline font data is divided into a plurality of outline sections. The constructing step includes steps of judging whether or not each of the outline sections is a curved segment and specifying a plurality of approximate points positioned on and approximately defining the curved segment. The constructing step further includes steps of forming, from the specified approximate points, a polygonal line element structure indicative of an outline section forming the curved segment approximately drawn as a polygonal line by the drawing output device, and connecting the polygonal line element structure to the graphic path.

In accordance with a further aspect of the present invention, an outline font data processing apparatus is provided in which an outline font dictionary contains outline font data indicative of outlines of characters drawn by a drawing output device. The outline font data processing apparatus comprises dictionary storing means for having the outline font dictionary stored therein, path constructing means for reading out, from the dictionary storing means, the outline font data indicative of one of the characters, and for constructing a graphic path covering the whole of the outlines of the one of the characters by forming a plurality of element structures based on the outline font data read out from the dictionary storing means and by connecting the element structures. Each of the outlines indicated by the read out outline font data is divided into a plurality of outline sections. The outline font data processing apparatus further comprises element structure storing means for having the formed and connected element structures stored therein. The path constructing means includes judging means for judging whether or not each of the outline sections is a rectilinear segment, and forming means for forming, from the outline font data indicative of the continuous outline sections each forming a rectilinear segment, a polygonal line element structure indicative of a continuous outline section drawn as a polygonal line by the drawing output device. The path constructing means further includes connecting means for connecting the polygonal line element structure to the graphic path.

In accordance with also an aspect of the present invention, an outline font data processing apparatus is provided in which an outline font dictionary contains outline font data indicative of outlines of characters drawn by a drawing output device. The outline font data processing apparatus comprises dictionary storing means for having the outline font dictionary stored therein, path constructing means for reading out, from the dictionary storing means, the outline font data indicative of one of the characters, and for constructing a graphic path covering the whole of the outlines of the one of the characters by forming a plurality of element structures based on the outline font data read out from the dictionary storing means and by connecting the element structures. Each of the outlines indicated by the read out outline font data is divided into a plurality of outline sections. The outline font data processing apparatus further comprises element structure storing means for having the formed and connected element structures stored therein. The path constructing means includes judging means for judging whether or not each of the outline sections is a curved segment and specifying means for specifying a plurality of approximate points positioned on and approximately defining the curved segment. The path constructing means further includes forming means for forming, from the specified approximate points, a polygonal line element structure indicative of an outline section forming the curved segment approximately drawn as a polygonal line by the drawing output device, and connecting means for connecting the polygonal line element structure to the graphic path.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a block diagram illustrating data groups contained in a prior-art outline font dictionary;

DESCRIPTION OF THE PREFERRED EMBODIMENTS

A preferred embodiment of the outline font data processing method and apparatus according to the present invention will be hereinafter described with reference concurrently to FIGS. 7 to 19.

Figure 7:
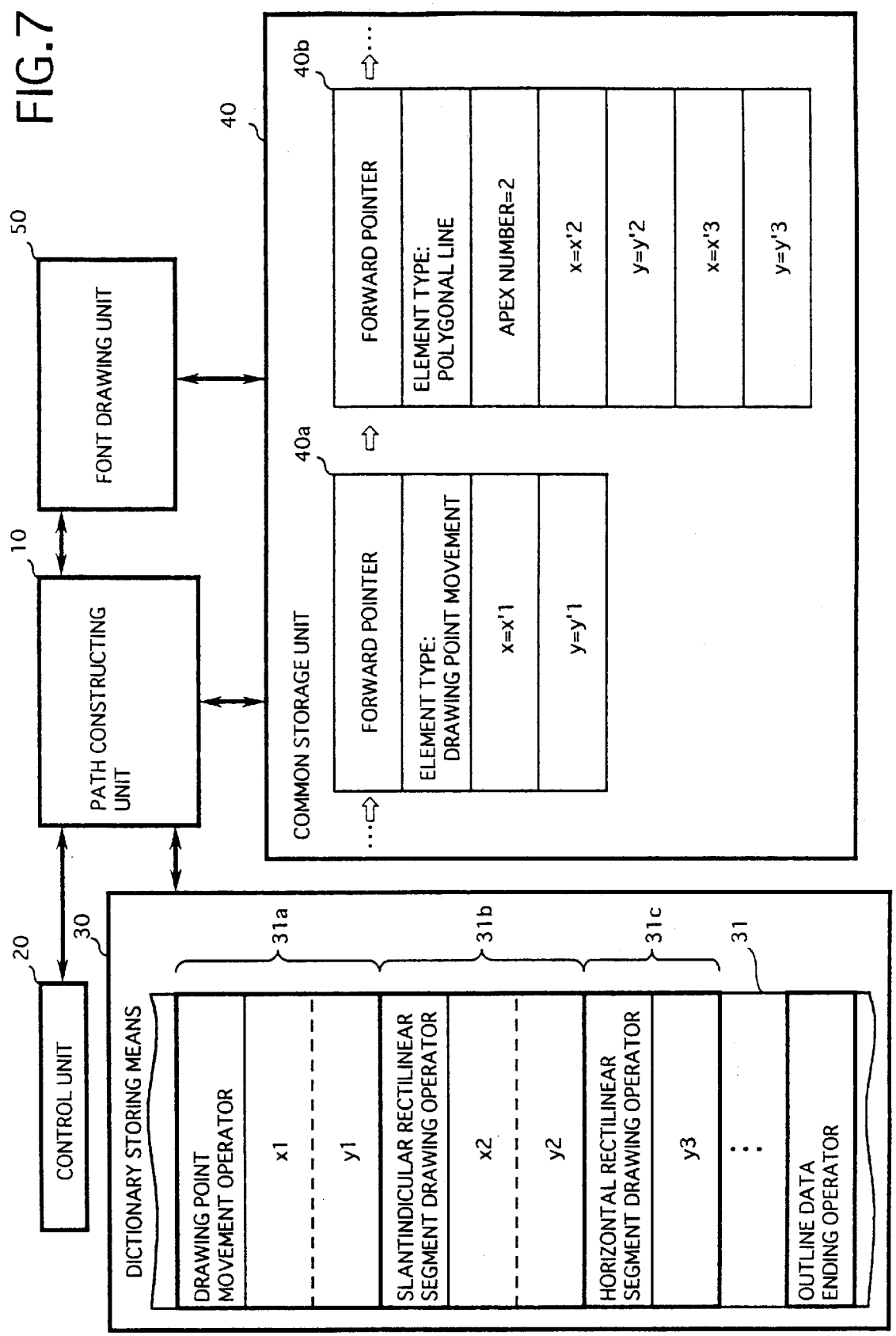
FIG. 7 is a block diagram of an outline font data processing apparatus according to the present invention.

Referring first to FIG.7, the outline font data processing apparatus comprises a path constructing unit 10, a dictionary storage unit 30, a font drawing unit 50 and a common storage unit 40 referred to by the path constructing unit 100 and the font drawing unit 150 without discrimination. The path constructing unit 10 is adapted to read out outline font data from an outline font dictionary 31, and reserve a plurality of memory areas in the common storage unit 40 for a plurality element structures, respectively, described below in detail. The path constructing unit 10 is further adapted to form and store the element structures in the reserved memory areas, respectively, and connect the element structures in turn to construct a graphic path. The dictionary storage unit 30 is, for example, a hard disk or a ROM (Read-only Memory) and has an outline font dictionary 31 stored therein. The outline font dictionary 31 has the same construction as the dictionary shown in FIG. 1 and therefore is constructed on the assumption that outlines of each of characters are divided into a plurality of outline sections such as rectilinear segments and curved segments as well as on the assumption that all the outlines of each of the characters are formed by drawing the outline sections in turn in a dictionary coordinate system provided for the outline font dictionary 31. The outline font data indicative of one character are constituted by drawing data groups of drawing point movement types, segment drawing types and data ending types. Each of the drawing data groups of drawing point movement types comprises a drawing point movement operator indicating that the drawing position is moved from the current point to a destination point without drawing, and a coordinate data set indicative of coordinates of the destination point in the dictionary coordinate system. Each of the drawing data groups of segment drawing types comprises a rectilinear segment drawing operator indicating that the drawing point is moved rectilinearly from the current point to a destination point to draw a rectilinear segment and a coordinate data set indicative of coordinates of the destination point in the dictionary coordinate system, or a curved segment drawing operator indicating that the drawing point is moved on a curved line from the current point to a destination point to draw a curved segment and a coordinate data set indicative of the destination point in the dictionary coordinate system. Each of the drawing data groups of data ending types comprises an outline data ending operator indicating the ending of data groups defining the outlines of one character.

Figure 2:
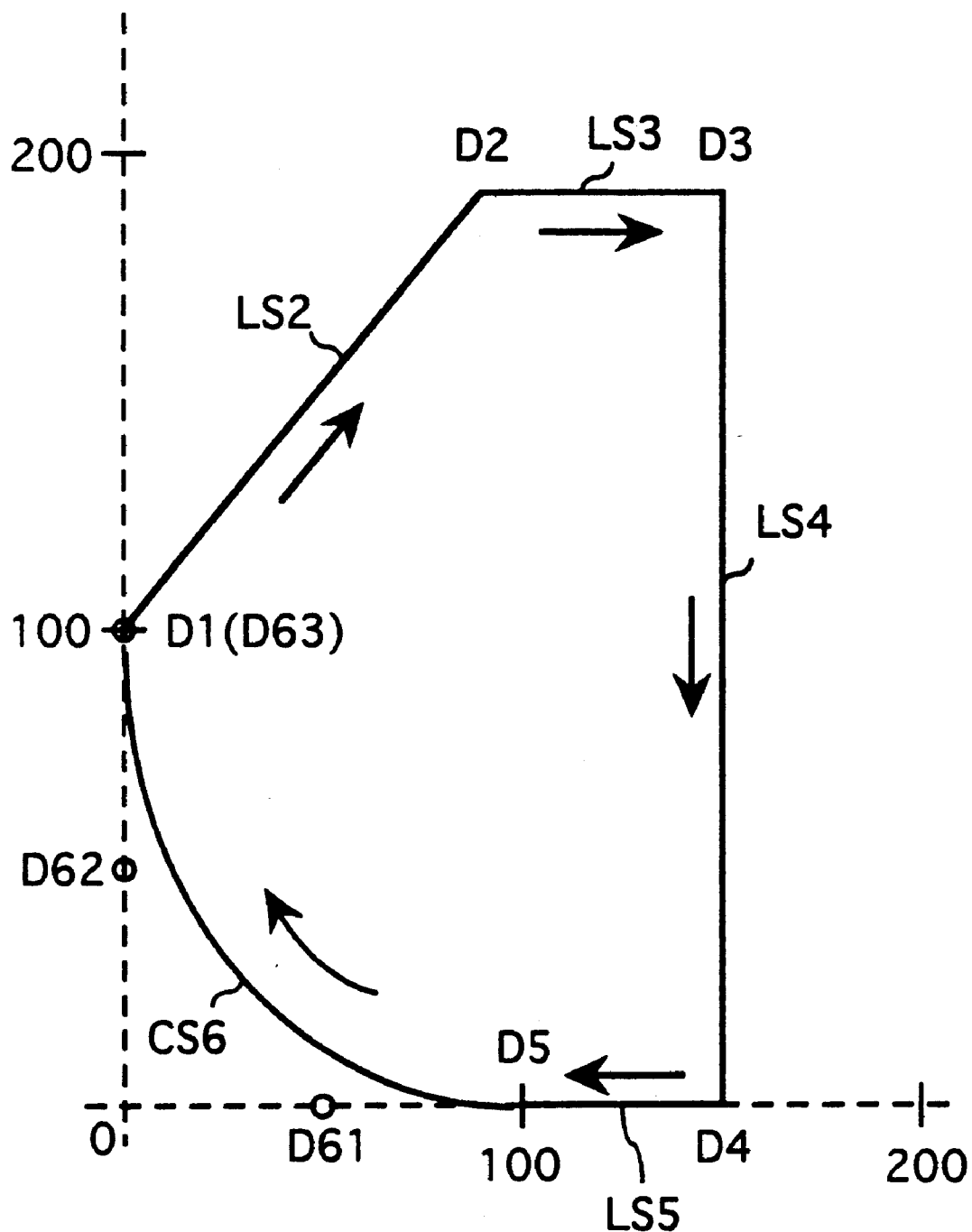
FIG. 2 is a diagram illustrating an outline drawn in a dictionary coordinate system on the basis of the data groups shown in FIG. 1.
Figure 3:
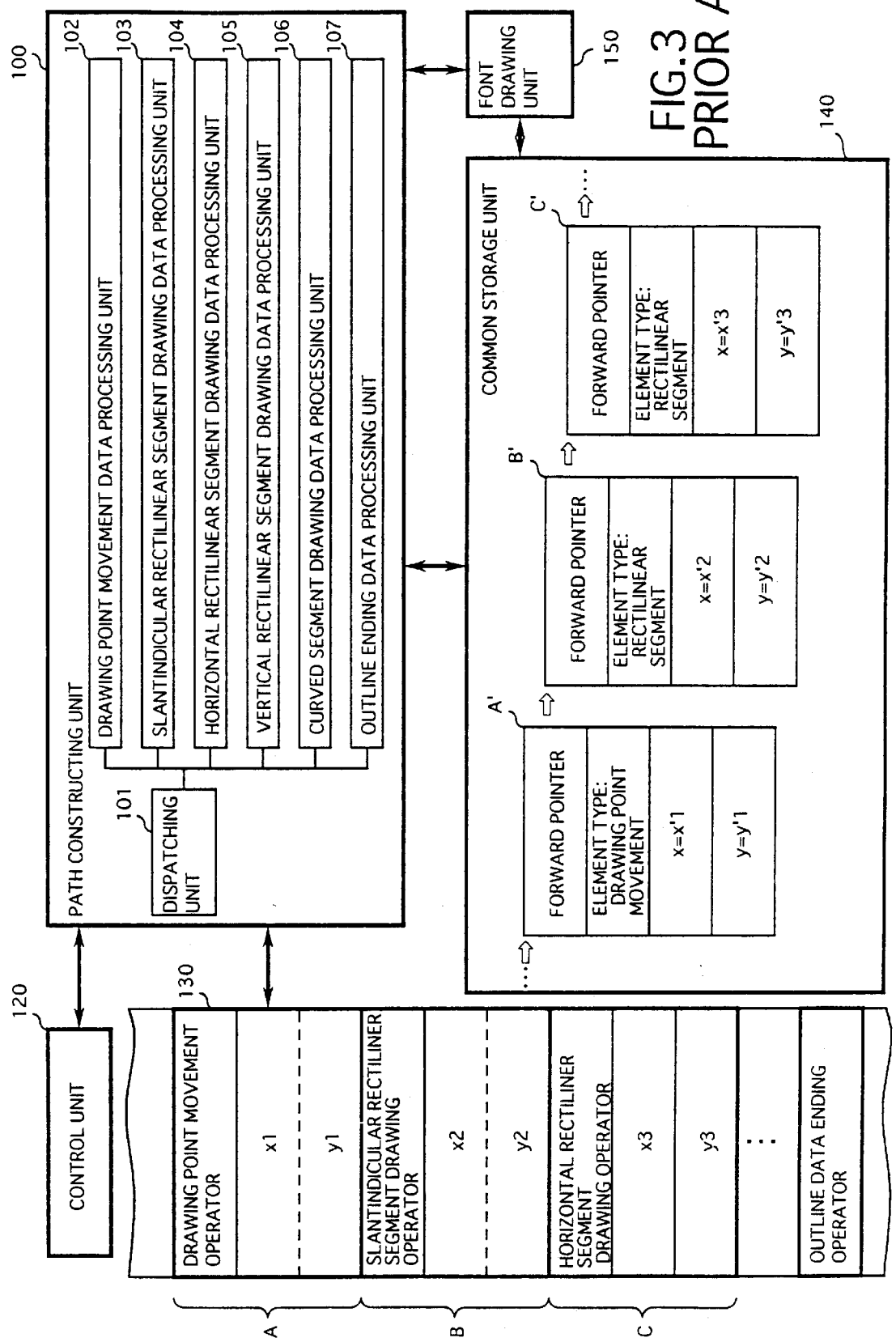
FIG. 3 is a block diagram illustrating a prior-art outline font data processing apparatus.
Figure 4:
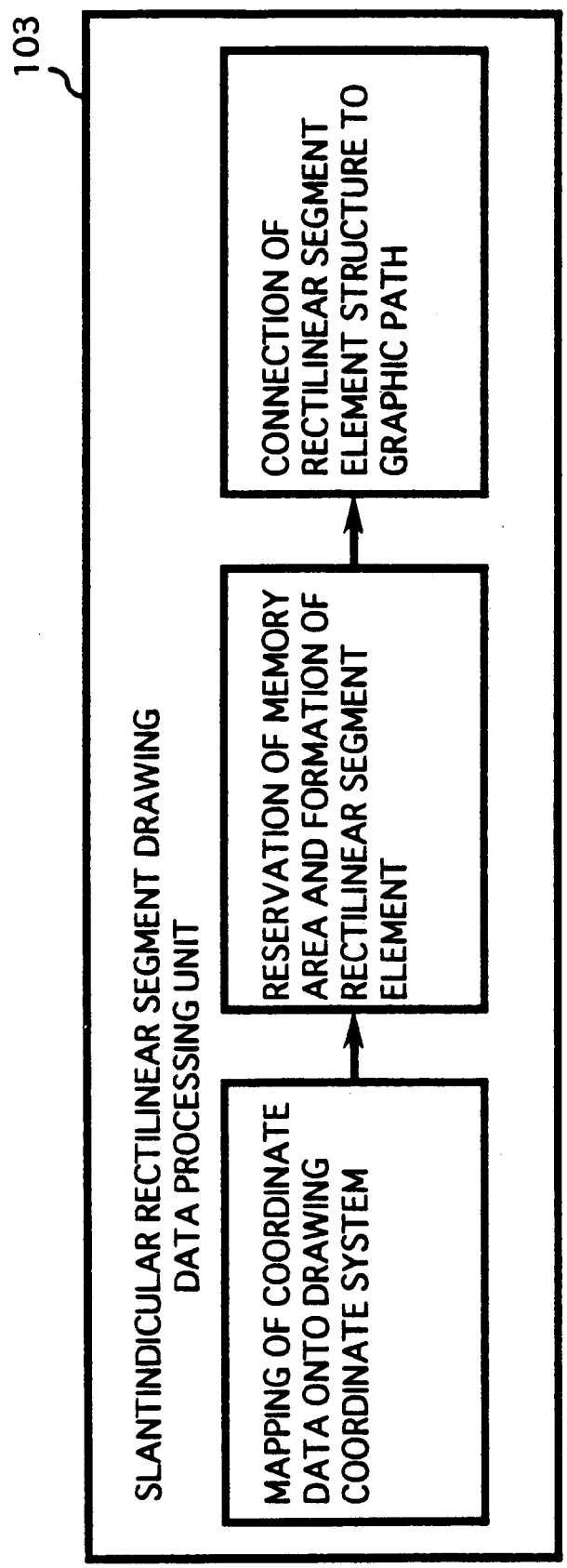
FIG. 4 is a schematic diagram illustrating a rectilinear segment drawing data processing unit shown in FIG. 3 and data processing steps performed thereby.
Figure 5:
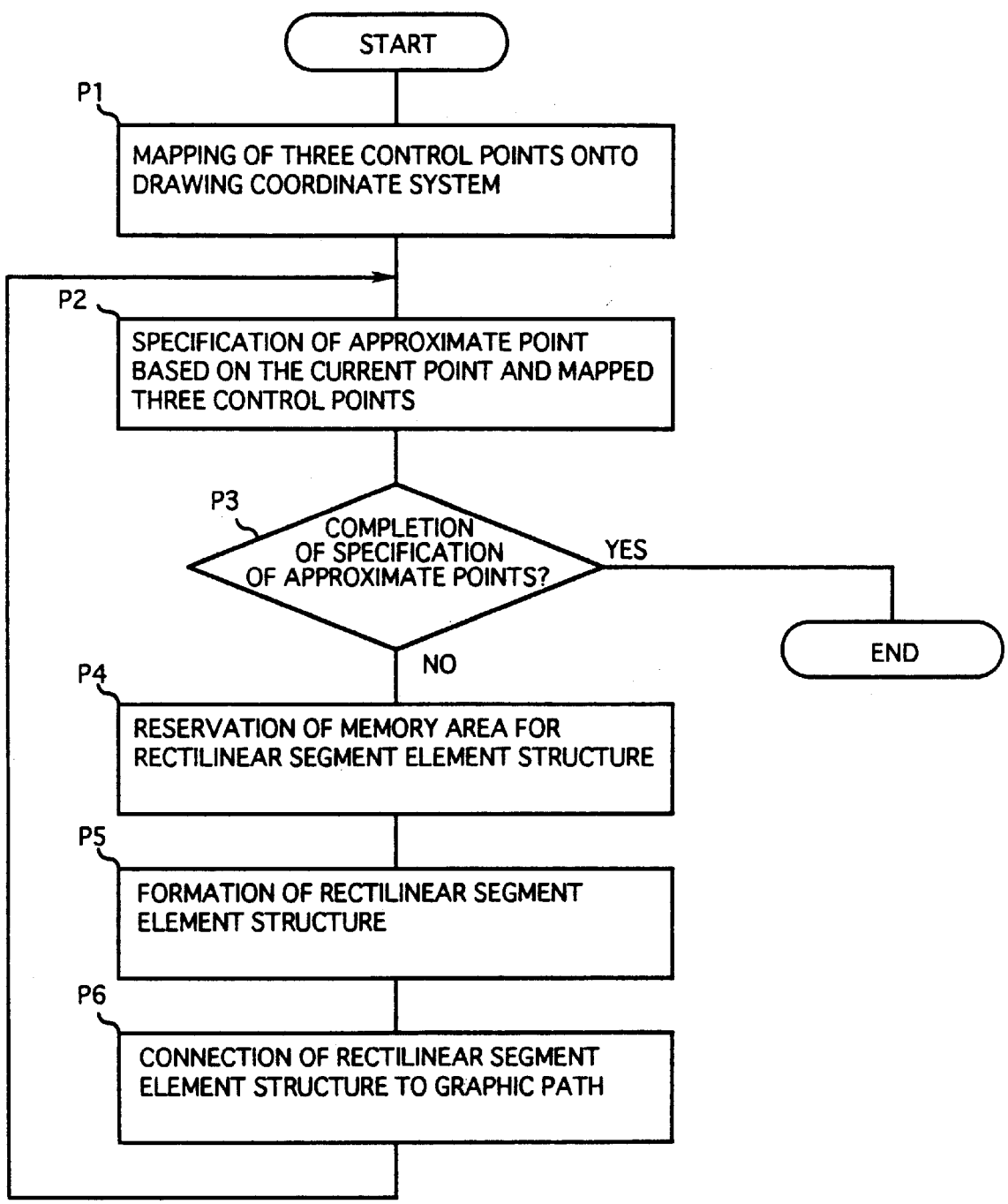
FIG. 5 is a flow chart illustrating data processing steps performed by a curved segment drawing data processing unit shown in FIG. 3.
Figure 6:
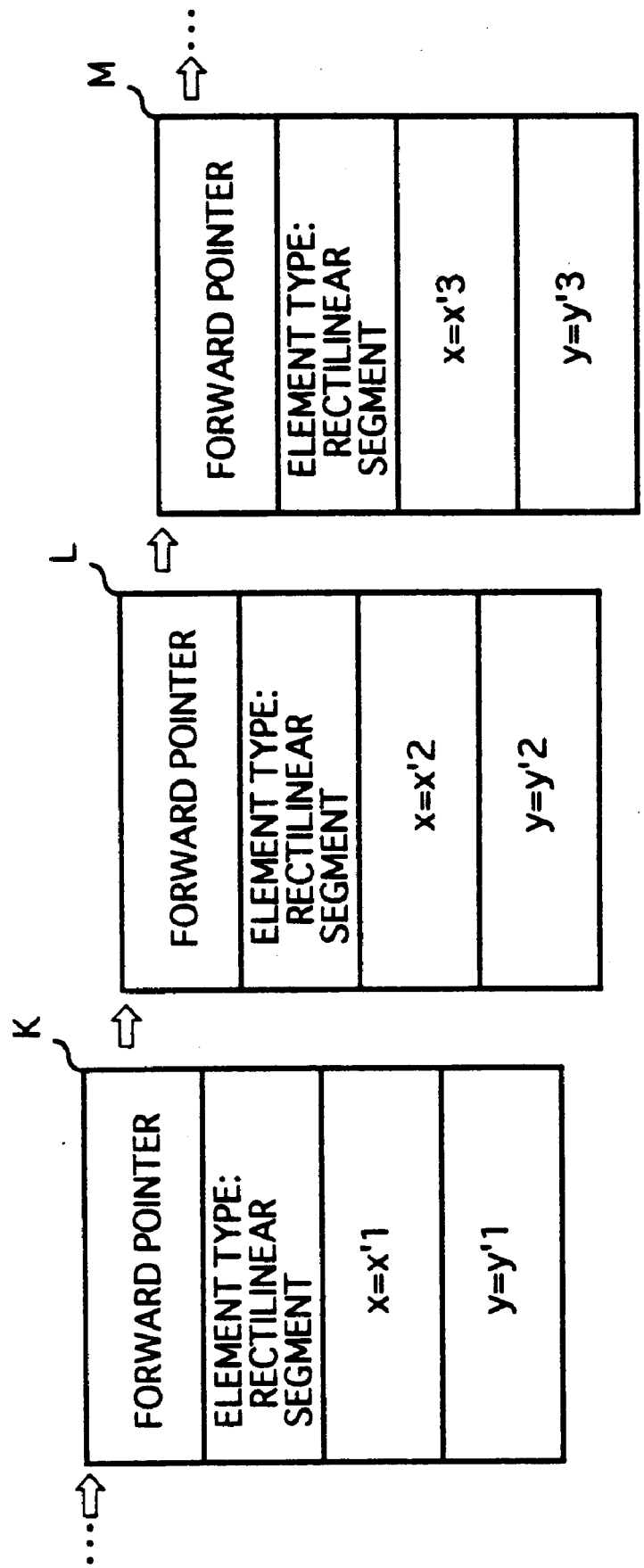
FIG. 6 is a schematic diagram illustrating element structures formed through the data processing steps shown in FIG. 5.

Each of the element structures includes data on the basis of which a drawing output device (not shown) such as a display device or printing device has the outlines of the character partly drawn on a screen or on paper. In the present embodiment, the element structures includes drawing point movement element structures and polygonal line element structures. The former element structures have the same data arrangement as the element structure A' shown in FIG. 3 and, for this reason, the description regarding the former element structure is omitted in order to avoid repetitive explanation. The latter element structure will become apparent as the description proceeds.

Figure 8:
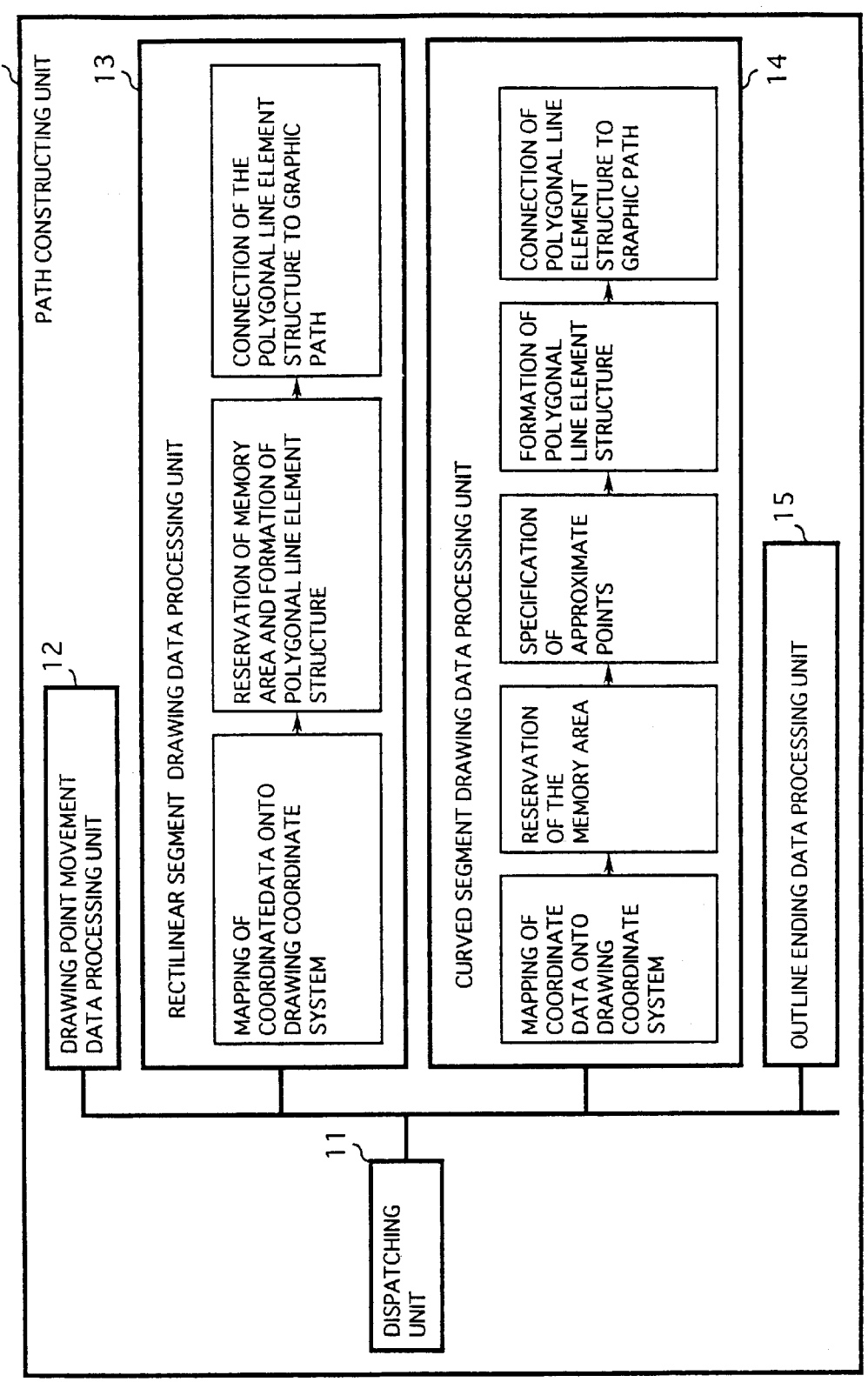
FIG. 8 is a block diagram illustrating a path constructing unit shown in FIG. 7.

The path constructing unit 10 is shown in FIG. 8 as comprising a dispatching unit 11, a drawing point movement data processing unit 12, a rectilinear segment drawing data processing unit 13, a curved segment drawing data processing unit 14 and an outline ending data processing unit 15. Upon receiving an instruction to draw a character from a control unit 20, the path constructing unit 10 reads out the outline font data specifying the character from the outline font dictionary 31 stored in the dictionary storing means 30. The outline font data read out from the outline font dictionary 31 are judged as to operator type by the dispatching unit 11. If the read outline font data is of a drawing point movement operator type, the read outline font data are transferred to the drawing point movement data processing unit 12. If the data is of a rectilinear segment drawing operator type, the read outline font data are transferred to the rectilinear segment drawing data processing unit 13. If the data is of a curved segment drawing operator type, the read outline font data are transferred to the curved segment drawing data processing unit 14. If the data is of an outline data ending operator type, the read outline font data are transferred to the outline ending data processing unit 15. When the drawing data groups of rectilinear segment drawing operator types are continuously read out from the outline font dictionary 31, the dispatching unit 11 is further operated to form a coordinate data congregation array, described below in detail, based on the read out drawing data groups of rectilinear segment drawing operator types and, subsequently operated to transfer the formed coordinate data congregation array to the rectilinear segment drawing data processing unit 13.

Figure 9:
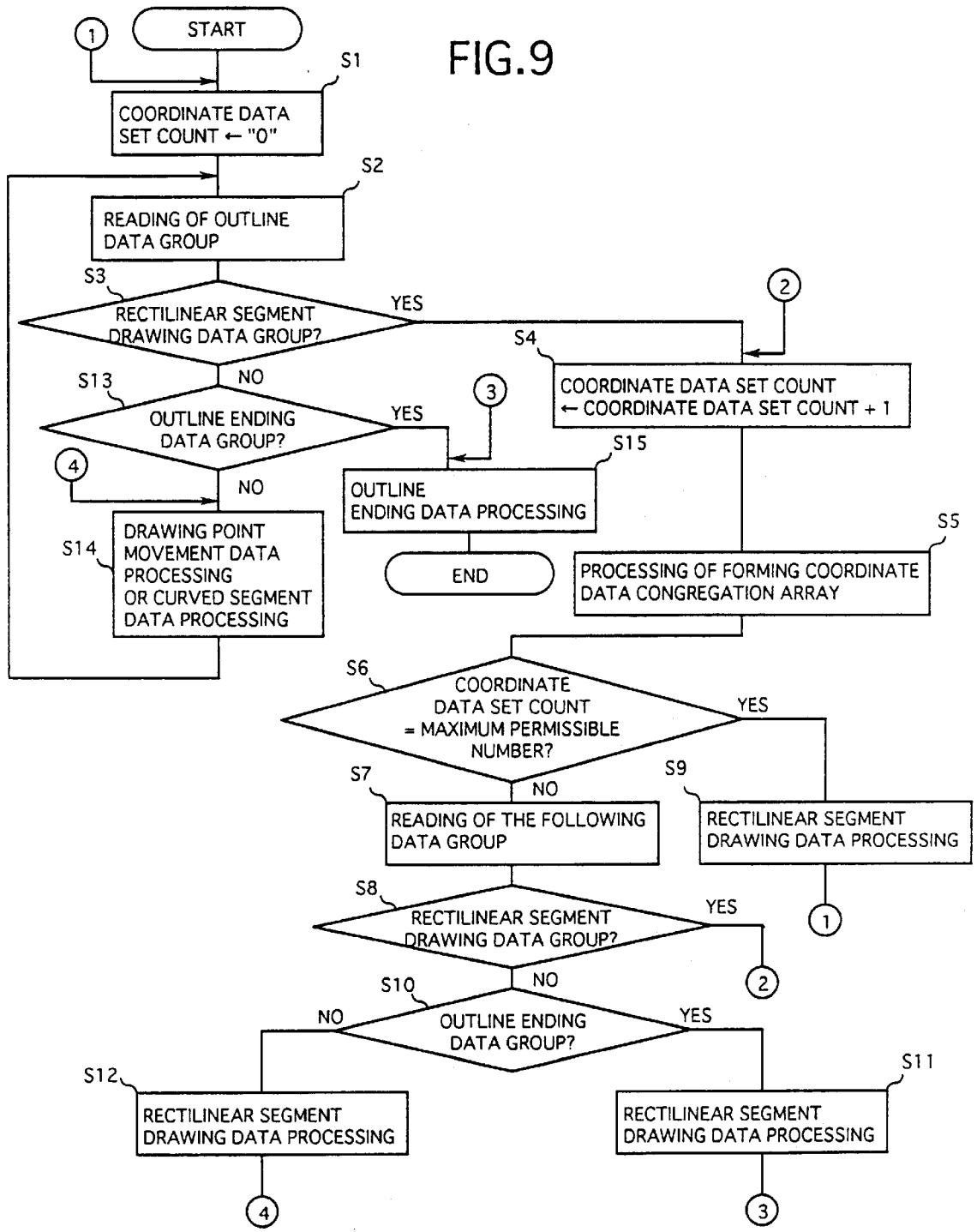
FIG. 9 is a flow chart illustrating an outline font data processing method according to the present invention.

The data processing steps taken by the path constructing unit 10 will be described in detail with reference to FIG. 9 which is in the form of a flow chart.

In a step S1, a coordinate data set count representative of the number of coordinate data sets included in the coordinate data congregation array is set to "0" by the dispatching unit 11. The step S1 is followed by a step S2 in which a drawing data group is read out from the outline font dictionary 31 by the dispatching unit 11. In a step S3, a determination is made by the dispatching unit 11 on whether or not the read out drawing data group is of a rectilinear segment drawing operator type. If the answer in the step S3 is in the affirmative "YES", the step S3 proceeds to a step S4 to change the coordinate data set count with an increment of "1", the step S4 proceeds to a step S5 to perform a process for forming the coordinate data congregation array. The step S5 is followed by a step S6 in which a determination is made on whether or not the coordinate data set count is equal to a maximum permissible number predetermined by the dispatching unit 11. If the answer in the step S6 is in the negative "NO", the step S6 proceeds to a step S7 in which the following drawing data group is read out from the outline font dictionary 31 by the dispatching unit 11. The step S7 is followed by a step S8 in which a determination is made on whether or not the drawing data group read out in the step S7 is of a rectilinear segment drawing operator type. If the answer in the step S8 is in the affirmative "YES", the step S8 returns to the step S4. In this case, the steps S4 through S8 are repeated until the coordinate data set count is equal to the maximum permissible number. If the answer in the step S6 is in the affirmative "YES", the step S6 proceeds to a step S9 to carry out processes for forming a polygonal element structure. The step S9 return to the step S1. Specifically, the dispatching unit 11 transfers the coordinate data congregation array obtained by repeating the steps S4 to S8 to the rectilinear segment drawing data processing unit 13 in which the coordinate data congregation array is processed in a manner described hereinafter in detail.

The dispatching unit 11 reserves a memory area, for example, in the common storage device 40 for the coordinate data congregation array. As described above, the number of coordinate data sets included in the coordinate data congregation array is limited to the predetermined maximum permissible number and, as a consequence, the memory area for the coordinate data congregation array can be previously reserved as an exclusive memory area. This means that it is unnecessary for the dispatching unit 11 to take time out to reserve the memory area for the coordinate data congregation array as well as that the process for forming the coordinate data congregation array is prevented from being disturbed because of a deficiency of the memory area. The limitation of the number of coordinate data sets included in the coordinate data congregation array results in the data size for the polygonal element structure being automatically limited to a certain data size because of the fact that each of the polygonal element structures is formed based on each of the coordinate data congregation arrays.

If the answer in the step S8 is in the negative "NO", the step S8 proceeds to a step S10 in which a judgment is made on whether or not the read out drawing data group is of a outline data ending operator type. If the answer in the step S10 is in the affirmative "YES", the step S 10 proceeds to a step S 11 to perform the same rectilinear segment data processing that is performed in the step S 9. The step S11 proceeds to a step S 15 described below. If, on the other hand, the answer in the step S 10 is in the negative "NO", the step S10 proceeds a step S 12 to carry out the same rectilinear segment drawing data processing that is performed in the step S9 and, subsequently, proceeds to a step S14. Specifically, in the steps S11 and S12, the coordinate data congregation array formed in the step S5 is transferred from the dispatching unit 11 to the rectilinear segment drawing data processing unit 13 by which the rectilinear segment drawing data processing is carried out. In this instance, the number of the coordinate data sets included in the coordinate data congregation array is less than the maximum permissible number.

If the answer in the step S3 is in the negative "NO", the step S3 proceeds to a step S13 in which a determination is made on whether or not the read out drawing data group is of an outline data ending operator type. If the answer in the step S13 is in the negative "NO", i.e., if the read out drawing data group is of a drawing point movement operator type or curved segment drawing operator type, the step S13 proceeds to the step S14 to perform the drawing position movement data processing or the curved segment data processing. The step S14 returns to the step S2 to read out the following drawing data group from the outline font dictionary 31. If, on the other hand, the answer in the step S13 is in the affirmative "YES", the step S13 proceeds to the step S15 to perform the outline end data processing. Specifically, in the step S15, the drawing data group of the outline data ending operator type is transferred from the dispatching unit 11 to the outline ending data processing unit 15 to substitute data indicative of the ending of the outline font, for example, "0" for a pointer of the latest one of previously formed element structures forming the graphic path, thereby bringing the graphic path constructing steps to an end.

In the step S5, the coordinate data congregation array can be formed by merely arranging the coordinate data of the data groups in turn if the drawing data groups of the rectilinear segment drawing operator types are unified with one another in coordinate data format. However, the drawing data groups of rectilinear segment drawing operator types are, in general, not unified with one another in order to reduce the data size of the outline font dictionary. The dispatching unit 11, therefore, not only forms the coordinate data congregation array but also unifies the coordinate data sets included in the coordinate data congregation array with one another in coordinate data format. When the coordinate data congregation array are thus constructed, the graphic path constructing process and outline drawing process can be carried out with ease. The rectilinear segment drawing data groups included in a conventional outline font dictionary are classified, for instance, into six type groups consisting of a slantindicular rectilinear segment drawing data group of an absolute coordinate type, a slantindicular rectilinear segment drawing data group of a relative coordinate type, a horizontal rectilinear segment drawing data group of an absolute coordinate data type, a vertical rectilinear segment drawing data group of an absolute coordinate data type, a horizontal rectilinear segment drawing group of a relative coordinate data type and a vertical rectilinear segment drawing group of a relative coordinate data type as will be best shown in FIG. 10.

The slantindicular rectilinear segment drawing data group of the absolute coordinate type comprises an absolute coordinate type slantindicular rectilinear segment drawing operator indicating that the drawing point is moved on a slanted straight line from the current point to a destination point to draw a slantindicular rectilinear segment inclined with respect to the x-axis and y-axis defining the dictionary coordinate system, and a coordinate data set indicative of absolute x-coordinate and y-coordinate of the destination point in the dictionary coordinate system. The slantindicular rectilinear segment drawing data group of the relative coordinate type comprises a relative coordinate type slantindicular rectilinear segment drawing operator indicating that the drawing point is slantingly moved on a straight line from the current point to a destination point to draw a slantindicular rectilinear segment inclined with respect to the x-axis and y-axis defining the dictionary coordinate system, and a coordinate data set indicative of relative x-coordinate and y-coordinate of the destination point with respect to the current point in the dictionary coordinate system. The horizontal rectilinear segment drawing data group of the absolute coordinate type comprises an absolute coordinate type horizontal rectilinear segment drawing operator indicating that the drawing point is horizontally moved on a straight line from the current point to a destination point to draw a rectilinear segment in a parallel relationship to the x-axis of the dictionary coordinate system, and a coordinate data set indicative of an absolute x-coordinate of the destination point in the dictionary coordinate system. The vertical rectilinear segment drawing data group of the absolute coordinate type comprises an absolute coordinate type vertical rectilinear segment drawing operator indicating that the drawing position is vertically moved on a straight line from the current point to a destination point to draw a rectilinear segment in a parallel relationship to the y-axis of the dictionary coordinate system, and a coordinate data set indicative of an absolute y-coordinate of the destination point in the dictionary coordinate system. The horizontal rectilinear segment drawing data group of the relative coordinate type comprises a relative coordinate type horizontal rectilinear segment drawing operator indicating that the drawing point is horizontally moved on a straight line from the current point to a destination point to draw a rectilinear segment in a parallel relationship to the x-axis of the dictionary coordinate system, and a coordinate data set indicative of a relative x-coordinate of the destination point with respect to the current point in the dictionary coordinate system. The vertical rectilinear segment drawing data group of the relative coordinate type comprises a relative coordinate type vertical rectilinear segment drawing operator indicating that the drawing point is vertically moved on a straight line from the current point to a destination point to draw a rectilinear segment in a parallel relationship to the y-axis of the dictionary coordinate system, and a coordinate data set indicative of y-coordinate of the destination point with respect to the current point in the dictionary coordinate system.

Figure 10:
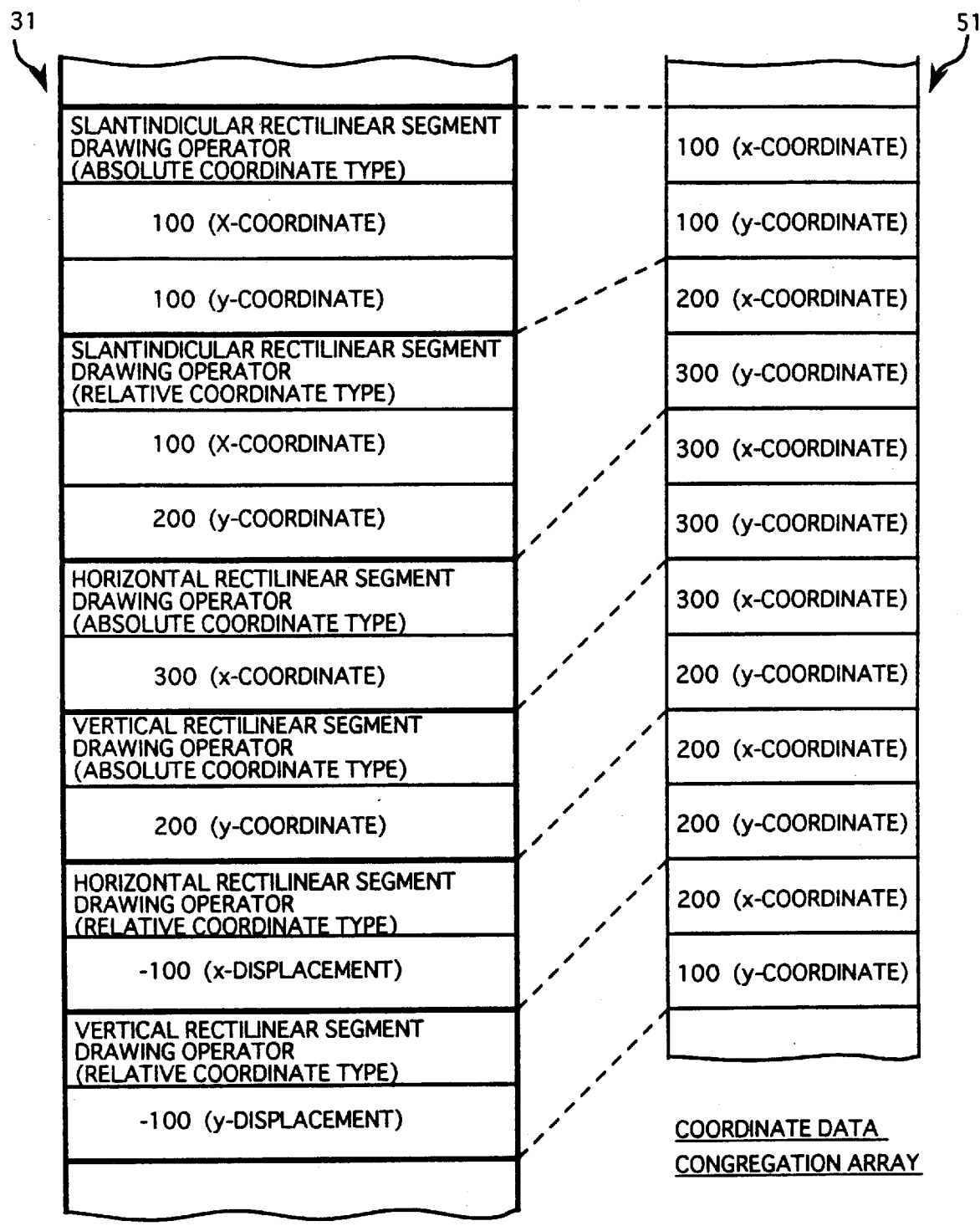
FIG. 10 is a schematic diagram illustrating the relationship between coordinate data sets contained in an outline font dictionary shown in FIG. 7 and coordinate data sets contained in a coordinate data congregation array.

When a wide variety of rectilinear segment drawing data groups are mingled and continuously arranged in the outline font dictionary as shown in FIG. 10, a coordinate data congregation array based on the mingled and continuously arranged rectilinear segment drawing data groups, such as denoted by a reference numeral 51 in FIG. 10, comprises coordinate data sets unified in coordinate style. All the coordinate data sets are constituted, for instance, by a set of absolute x-coordinate and y-coordinate in the dictionary coordinate system. Specifically, the absolute coordinates (100, 100) of the slantindicular rectilinear segment drawing data group of the absolute coordinate type shown in FIG. 10 is substituted for coordinates (x, y) of the first coordinate data set of the coordinate data congregation array shown in FIG. 10. The relative coordinates (100,200) of the slantindicular rectilinear segment drawing data group of the relative coordinate type are converted to absolute coordinates (200, 300) and substituted for coordinates (x, y) of the second coordinate data set of the coordinate data congregation array. The absolute x-coordinate (300) of the horizontal rectilinear segment drawing data group of the absolute coordinate type is substituted for x-coordinate of the third coordinate data set of the coordinate data congregation array, while the y-coordinate (300) of the second coordinate data set of the coordinate data congregation array is substituted for y-coordinate of the third coordinate data set of the coordinate data congregation array. The absolute y-coordinate (200) of the vertical rectilinear segment drawing data group of the absolute coordinate type is substituted for y-coordinate of the fourth coordinate data set of the coordinate data congregation array, while the x-coordinate (300) of the third coordinate data set of the coordinate data congregation array is substituted for x-coordinate of the fourth coordinate data set of the coordinate data congregation array. The relative coordinate x-coordinate (−100) of the horizontal rectilinear segment drawing data group of the relative coordinate type is converted to an absolute x-coordinate (200) and substituted for x-coordinate of the fifth coordinate data set of the coordinate data congregation array, while the y-coordinate (200) of the fourth coordinate data set of the congregation array is substituted for y-coordinate of the fifth coordinate data set of the congregation array. The relative y-coordinate (−100) of the vertical rectilinear segment drawing data group of the relative coordinate type is converted to an absolute y-coordinate (100) and substituted for y-coordinate of the sixth coordinate data set of the coordinate data congregation array, while the x-coordinate (200) of the fifth coordinate data set of the congregation array is substituted for x-coordinate of the sixth coordinate data set of the congregation array. The coordinate data sets of the coordinate data congregation array are herein shown as being unified into an absolute coordinate data style but, if desired, may be unified into a relative coordinate data style in which the coordinates are relatively defined with respect to the current point.

Figure 11:
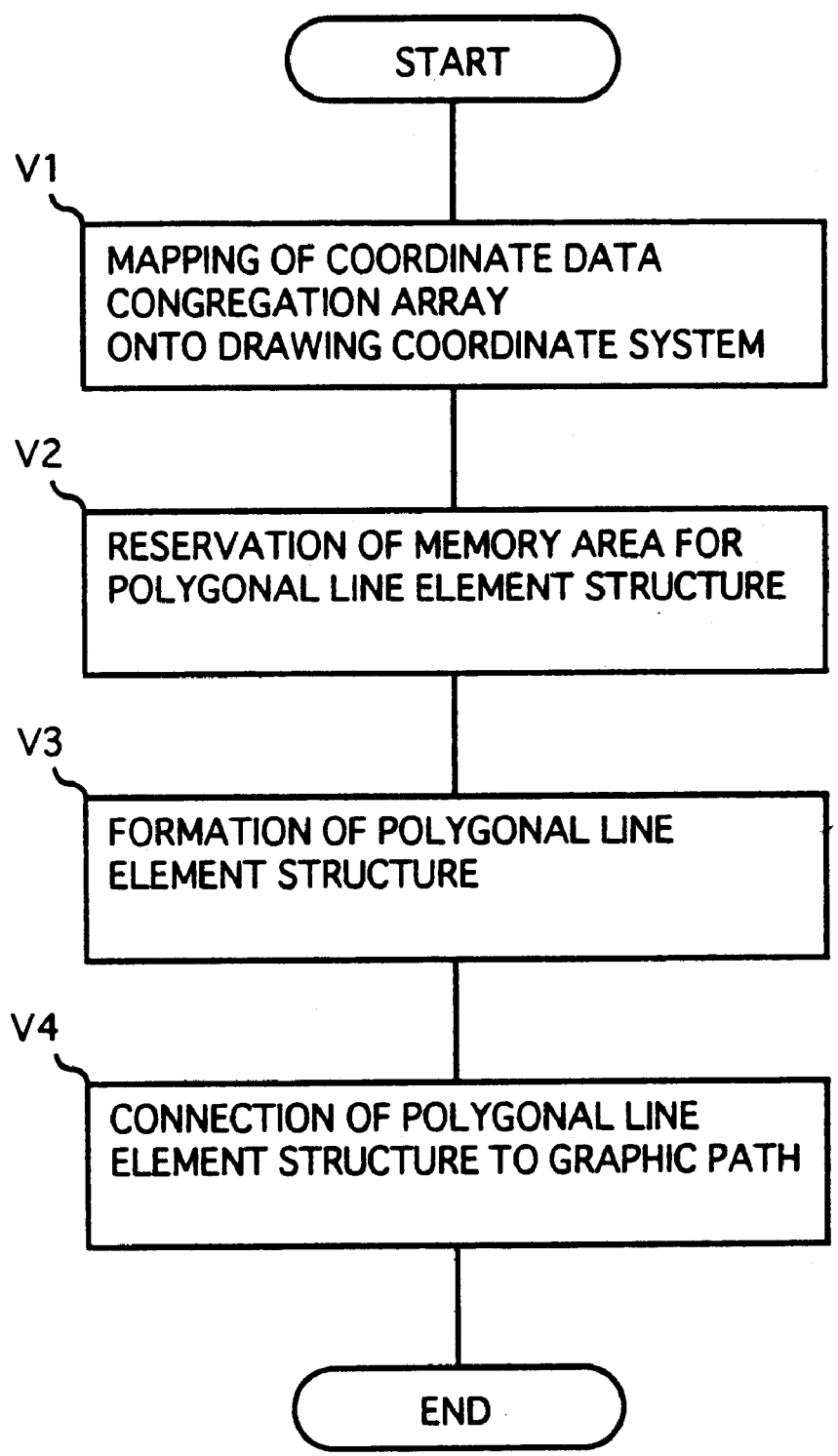
FIG. 11 is a flow chart illustrating in detail a rectilinear segment drawing data processing step shown in FIG. 9.
Figure 12:
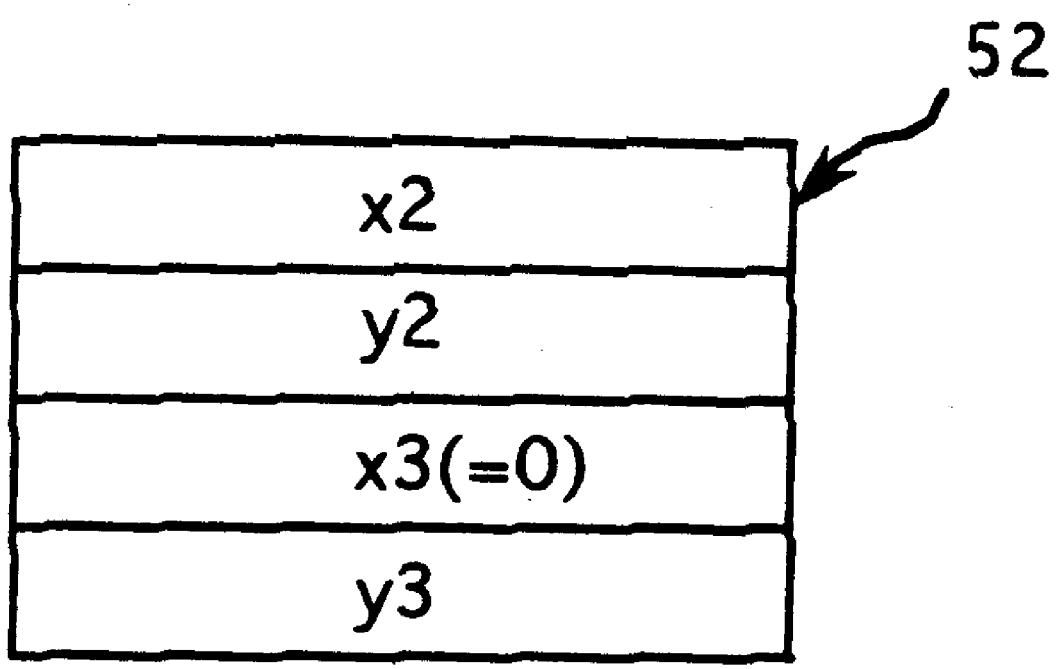
FIG. 12 is a schematic diagram illustrating a coordinate data congregation array based on two rectilinear segment drawing data groups shown in FIG. 7.

The rectilinear segment drawing data processing manner taken by the rectilinear segment drawing data processing unit 13 will be described hereinafter in detail with reference to FIG. 11 which is in the form of a flow chart.

When the coordinate data congregation array is transferred from the dispatching unit 11 to the rectilinear segment drawing data processing unit 13, the coordinate data sets of the coordinate data congregation array are, in a step V1, mapped onto the drawing coordinate system. The step V1 proceeds to a step V2 to reserve a memory area on the common storage device 40 for the coordinate data congregation array. Preferably, the reserved memory area may be a minimum size area permitting the coordinate data congregation array to be stored therein. The step V2 is followed by a step V3 in which a polygonal line element structure is formed and stored in the reserved memory area of the common storage device 40. Finally, in a step V4, the address of the polygonal line element structure formed in the step V3 is substituted for a pointer of the previous element structure partly forming a graphic path and, therefore, the polygonal line element structure is connected to the graphic path.

The polygonal line element structure formed through the foregoing steps comprises a pointer indicative of a location of the following element structure, element type data indicating that the polygonal line element structure itself is of apolygonal line element type, apex number data indicative of the number of apexes of a polygonal line including an end point of the polygonal line, and a coordinate data sets respectively indicative of coordinates of the apexes in the drawing coordinate system. The apexes of the polygonal line corresponds to end points of the continuous rectilinear segments, respectively.

The polygonal line element structure 40b shown in FIG. 7 is based on the slantindicular rectilinear segment drawing data group 31b and the horizontal rectilinear segment drawing data group 31c. More specifically, the slantindicular rectilinear segment drawing data group 31b and the horizontal rectilinear segment drawing data group 31c are continuously arranged and of rectilinear segment drawing data types. Reading out the slantindicular rectilinear segment drawing data group 31b and the horizontal rectilinear segment drawing data group 31c from the outline font dictionary 31, the dispatching unit 11 forms a coordinate data congregation array shown in FIG. 12. In this instance, the coordinate data sets of the coordinate data congregation array are unified into a relative coordinate style because of the fact that both the slantindicular rectilinear segment drawing data group 31*b* and the horizontal rectilinear segment drawing data group 31*c* are of relative coordinate styles. Note that the dispatching unit 11 substitutes "0" for a coordinate x3 of the coordinate data congregation array shown in FIG. 12 in accordance with an indication of the operator of the horizontal rectilinear segment drawing data group 31*c*. The rectilinear segment drawing data processing unit 13 receives the coordinate data congregation array and maps coordinates (x2, y2) and (x3, y3) of the coordinate data congregation array onto the drawing coordinate system to obtain coordinates (x'2, y'2) and (x'3, y'3) to be respectively substituted for the first and second coordinate data sets of the polygonal element structure 40*b*. The polygonal element structure 40*b* thus formed has apex number data of "2" and element type data indicative of a polygonal line element type.

From the foregoing description and FIGS. 7 through 12 it will have been appreciated that the outline font data processing method and apparatus according to the present invention present numerous advantages described below.

On the basis of the outline font data representative of the continuous rectilinear segments partly forming the outlines of the character, there is formed at least one polygonal line element structure which causes the drawing output device to draw the continuous rectilinear segments as a polygonal line in an uninterrupted sequence. As a result, the present embodiment has an advantage over prior-art method and apparatus of reducing the number of memory area reservations for the element structures and saving the memory areas having the element structures stored therein. The reason for this is that, in the prior-art method and apparatus, the rectilinear segment element structures are formed as being equal in number to the continuous rectilinear segments and accordingly require numerous memory areas. For the same reason, the present embodiment has another advantage over the prior-art method and apparatus of reducing the total size of the memory areas storing therein element structures which define outline sections, respectively, including at least continuous rectilinear segments. The present embodiment has a further advantage over the prior-art method and apparatus of speeding up and simplifying the drawing operation of a character after the construction of the graphic path because of the fact that the font drawing unit of the present embodiment has only to read out one polygonal element structure from the common storage device to draw the continuous rectilinear segments.

As shown in FIG. 7 and described hereinbefore, the polygonal line element structure 40*b* includes a pointer indicative of location of the following element structure, element type data indicating that the polygonal line element structure is of a polygonal line element type, apex number data indicative of the number of apexes of the polygonal line including an end point of the polygonal line, and coordinate data sets indicative of coordinates of the apexes, respectively, in the drawing coordinate system. The element type data, apex number data, coordinate data set are easily determined on the basis of the operators, the number and the coordinate data sets of the continuously arranged rectilinear segment drawing data groups in the outline font dictionary. This means that the path constructing unit 10 can make the most of the data arrangement of a conventional outline font dictionary and easily form the polygonal element structure. Also, the data construction of the polygonal line element structure becomes simple and compact and, for this reason, the memory area having stored the polygonal line element structure therein is reduced in memory size. Therefore, the drawing operation can be further improved in its speed and ease of use.

The coordinate data set of the outline font dictionary is mapped onto the drawing coordinate system before the polygonal element structure is formed. The mapped coordinate data set is used as the coordinate data set of the polygonal element structure. Therefore, conventional data processing between the outline font data reading step and the data mapping step can be utilized and the conventional outline font dictionary can be utilized as it is.

The coordinate congregation array is so formed as to include coordinate data sets unified into absolute data style or relative data style and, for this reason, the polygonal line element structure is formed with ease even if the outline font dictionary includes both the coordinate data sets of absolute coordinate style or the coordinate data sets of relative coordinate style.

When the outline font dictionary includes different rectilinear segment drawing data groups consisting of slantindicular, horizontal, vertical rectilinear segment drawing data groups as well as when the outline font dictionary includes both absolute coordinate data sets and relative coordinate data sets, the polygonal line element structure is formed as including coordinate data sets each indicative of an x-coordinate and a y-coordinate in the absolute coordinate style or in the relative coordinate style. The polygonal line element structure is easily formed even if the outline font dictionary includes different rectilinear segment drawing data groups.

If the number of the continuous rectilinear segments exceeds the predetermined maximum permissible number, plural coordinate data congregation arrays are formed. Each of the coordinate data congregation arrays has coordinate data sets the number of which is equal to or less than the predetermined maximum permissible number. For this reason, the memory areas for the coordinate data congregation arrays are identical in memory size with one another. In addition, the memory area size for the coordinate data congregation arrays can be determined before the coordinate data congregation arrays are formed. Therefore, the memory area for each of the coordinate data congregation arrays can be reserved ahead of time and kept as an exclusive memory area. This means that it is unnecessary to take time to reserve the memory area for the coordinate data congregation array and that the coordinate data congregation array forming process is prevented from being disturbed because of a deficiency of the memory area. The limitation of the number of coordinate data sets included in the coordinate data congregation array results in a data size of the polygonal element structure being automatically limited to a certain data size because of the fact that the coordinate data congregation arrays are equal in number to the polygonal element structures to be formed.

The curved segment drawing data processing steps taken by the curved segment drawing data processing unit 14 will be described in detail with reference to FIGS. 13 to 19 of drawings.

Figure 13:
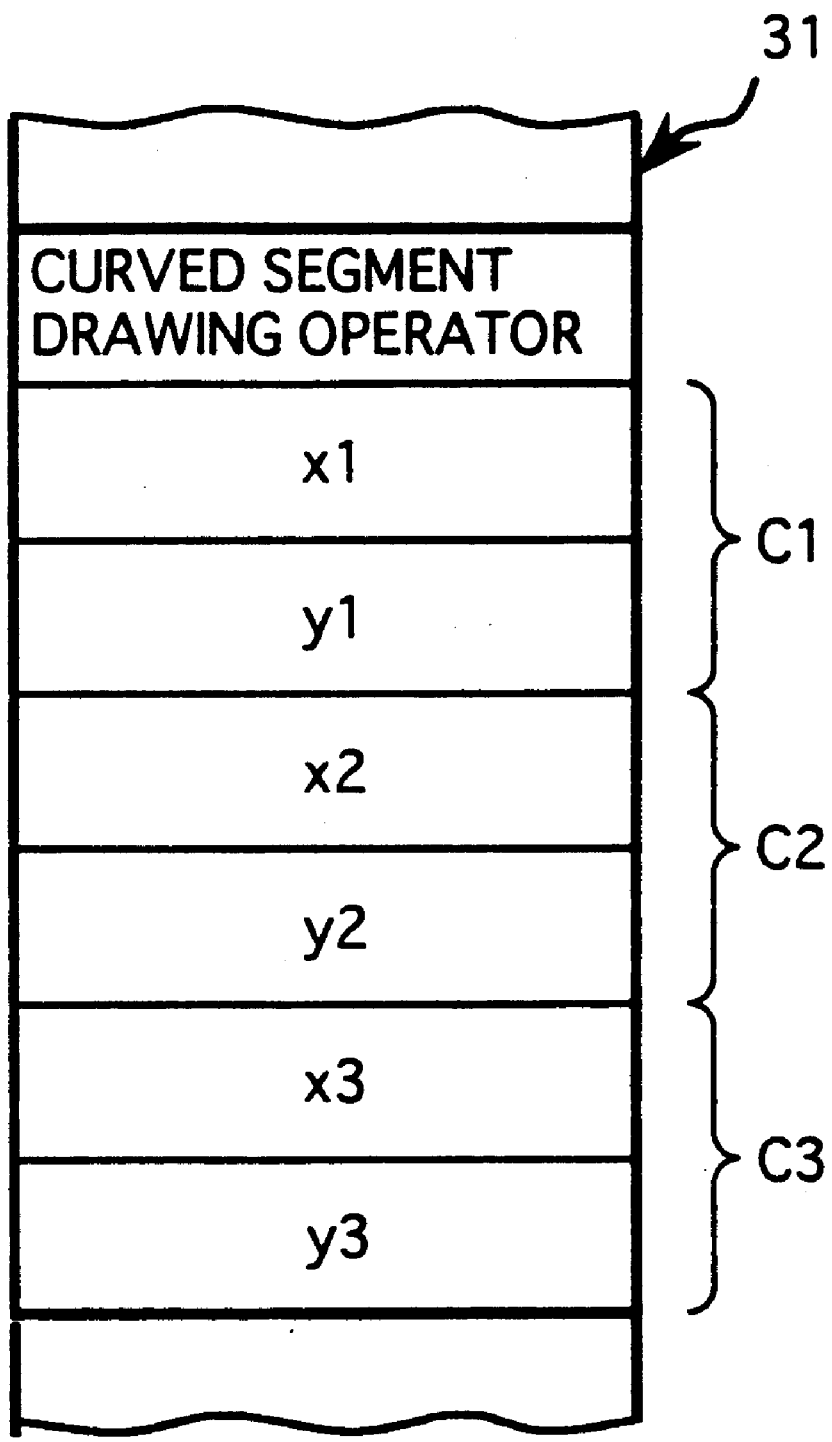
FIG. 13 is a schematic diagram illustrating a curved segment drawing data group contained in the outline font dictionary shown in FIG. 7.

FIG. 13 shows a curved segment drawing data group of the outline font dictionary 31. The curved segment drawing data group comprises a curved segment drawing operator indicating that the drawing point is moved on a curved line from the current point to a destination point to draw a curved segment in the dictionary coordinate system, and three coordinate data sets C1, C2 and C3 indicative of coordinates of three control points. The control point of the coordinate data set C3 is the destination point, i.e., the end point of the curved segment drawn in the dictionary coordinate system. The curved segment is a Bézier cubic curve defined by the three control points and the current point. The curved segment is approximately shaped by a plurality of rectilinear segments linking a plurality of approximate points in sequence. The approximate points obtained through either of different techniques consisting of a first technique in which the number of the approximate points can be calculated before the determination of the approximate points, and a second technique in which the number of the approximate points cannot be obtained until the determination of all the approximate points. The first and second techniques are known, for example, as a forward difference method and a recursive mid-point parting method, respectively.

The steps taken by a curved segment data processing unit 14 utilizing the forward difference method will be described hereinafter in detail with reference to FIG. 14. which is in the form of a flow chart.

Figure 15:
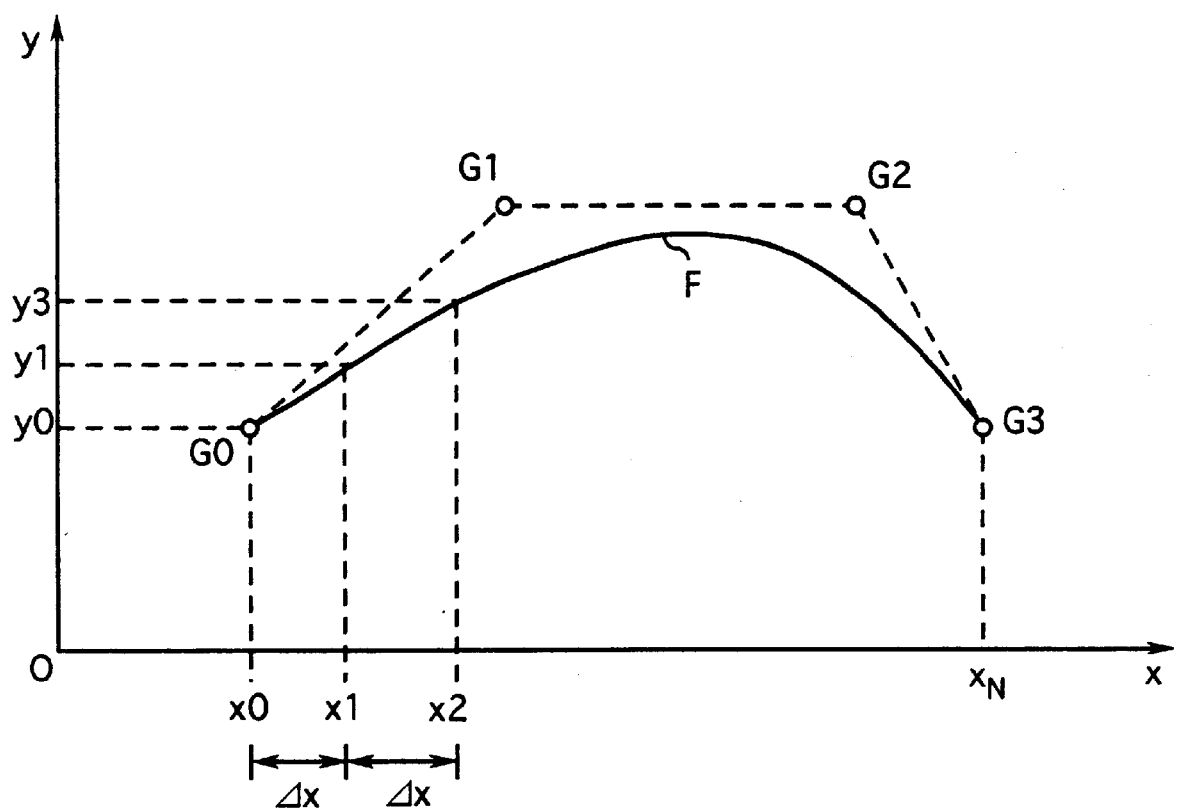
FIG. 15 is a diagram for explaining an approximate point specifying technique according to the forward difference method.

First, in a step T1, the coordinate data set included in the curved segment drawing data groups and indicative of the three control points are mapped onto the drawing coordinate system. The step T1 is followed by a step T2 in which the number N of approximates points is calculated on the basis of coordinate data of the current point and the mapped coordinate data set of the control points. FIG. 15 shows the current point G0 as the first control point, the mapped three control points G1, G2 and G3 and the curved segment (Bézier cubic curve) F defined by the four control points G0–G3. The approximate points are specified by sampling points on the curved segment F at regular small intervals each representative of Δx and, accordingly, the number of the approximate points are calculated by dividing, by the interval Δx, the length in an x-axis between the control points G0 and G3. Note that the interval Δx is held at a constant value during the obtainment of the approximate points on one curved segment, but, is replaced with another interval at the time that the curved segment is replaced with another curved segment. The second interval is determined on the basis of a shape of the second curved segment. The step T2 proceeds to a step T3 to reserve the memory area for a polygonal line element structure including coordinate data sets indicative of the coordinates of N apexes. In a step T4, "1" is substituted for n. The step T4 proceeds to a step T5 to specify the nth approximate point on the curved segment F. The first approximate point is specified on the curved segment F at a distance of Δx from the control point G0. The step T5 is followed by a step T6 in which the coordinates of the nth approximate point is substituted for the coordinates of the nth apexes of the polygonal element structure. The first approximate point is thus substituted for the coordinates of the first apex of the polygonal element structure. In step T7, a determination is made on whether n=N or not. If the answer in the step T7 is in the negative "NO", the step T7 proceeds to a step T8 wherein the variable n is set to n+1; then the step T8 return to the step T5. In this instance, the steps T5 through T8 are repeated until n=N to repeatedly specify the approximate points and substitute the coordinates of the approximate points for the coordinate data sets of the polygonal line element structure.

Figure 16:
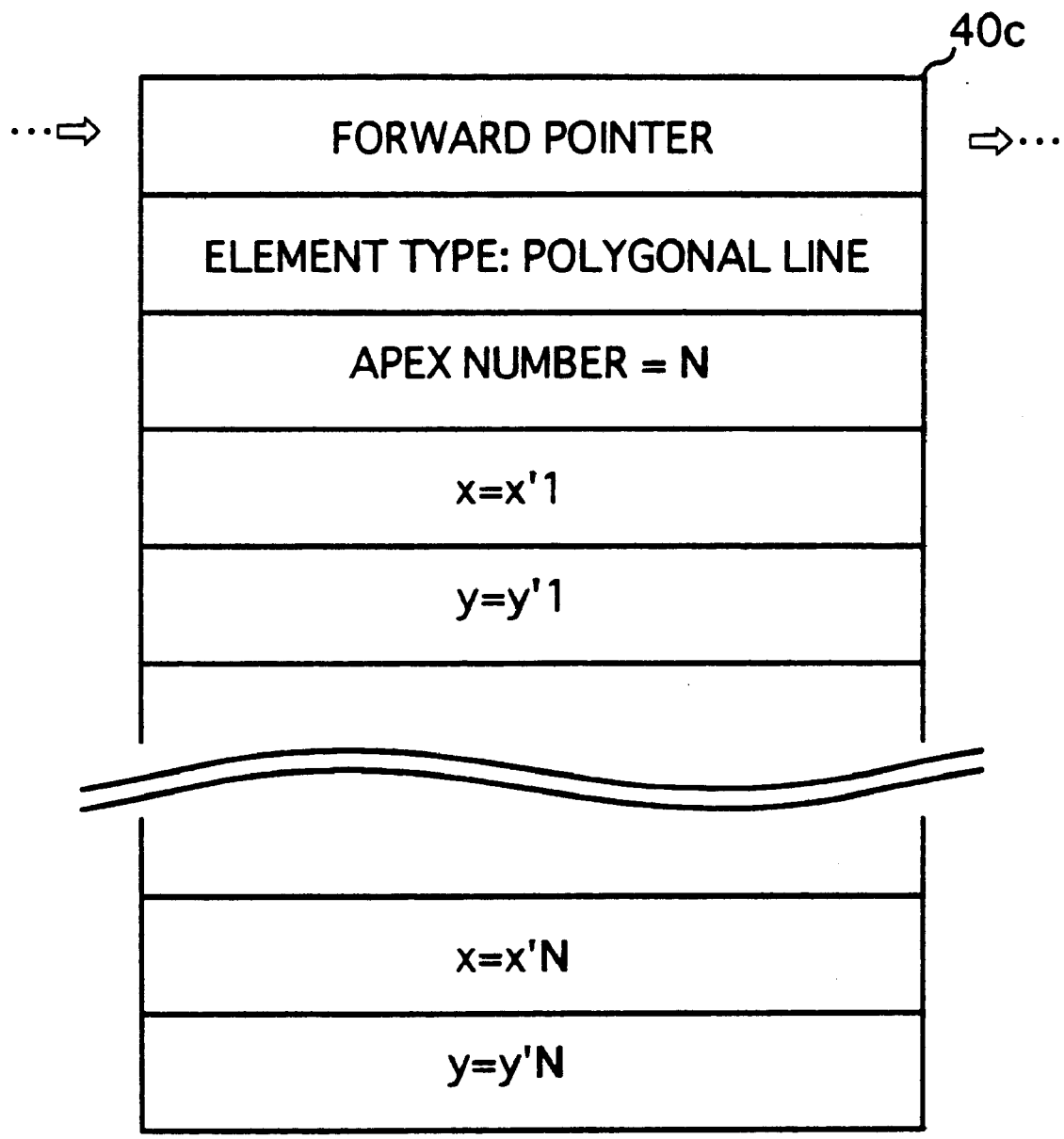
FIG. 16 is a schematic diagram illustrating a polygonal line element structure formed through the steps shown in FIG. 14.

If the answer in the step T7 is in the affirmative "YES", the step T7 proceeds to a step T9 to connect the polygonal line element structure to the graphic path by substituting the address of the present polygonal line element structure for the pointer of the previous element structure forming the tail of the current graphic path. The polygonal line element structure thus formed is shown in FIG. 16 as including a pointer specifying the following the element structure, element type data indicative of a polygonal line element structure type, apex number data representative of the number N of the apexes of the polygonal line including the end point thereof, and the coordinate data set of coordinates (x'1, y'1) . . . (x'N, y'N) of the apexes in the drawing coordinate system. The apexes of the polygonal line element structure correspond to the approximate points of the curved segment, respectively.

Steps taken by the curved segment data processing unit 14 utilizing the recursive mid-point parting method will be described hereinafter in detail with reference to FIG. 17 which is in the form of a flow chart.

In a step L1, the coordinate data set included in the curved segment drawing data groups and indicative of the three control points are mapped onto the drawing coordinate system. The step L1 is followed by a step L2 in which "1" is substituted for a variable n. The step L2 proceeds to the step L3 to reserve a memory area of the common storage device 40 for a polygonal line element structure including coordinate data sets indicative of the coordinates of M apexes. The step L3 proceeds to a step L4 to start to specify the approximate points on the curved segment.

Figure 18:
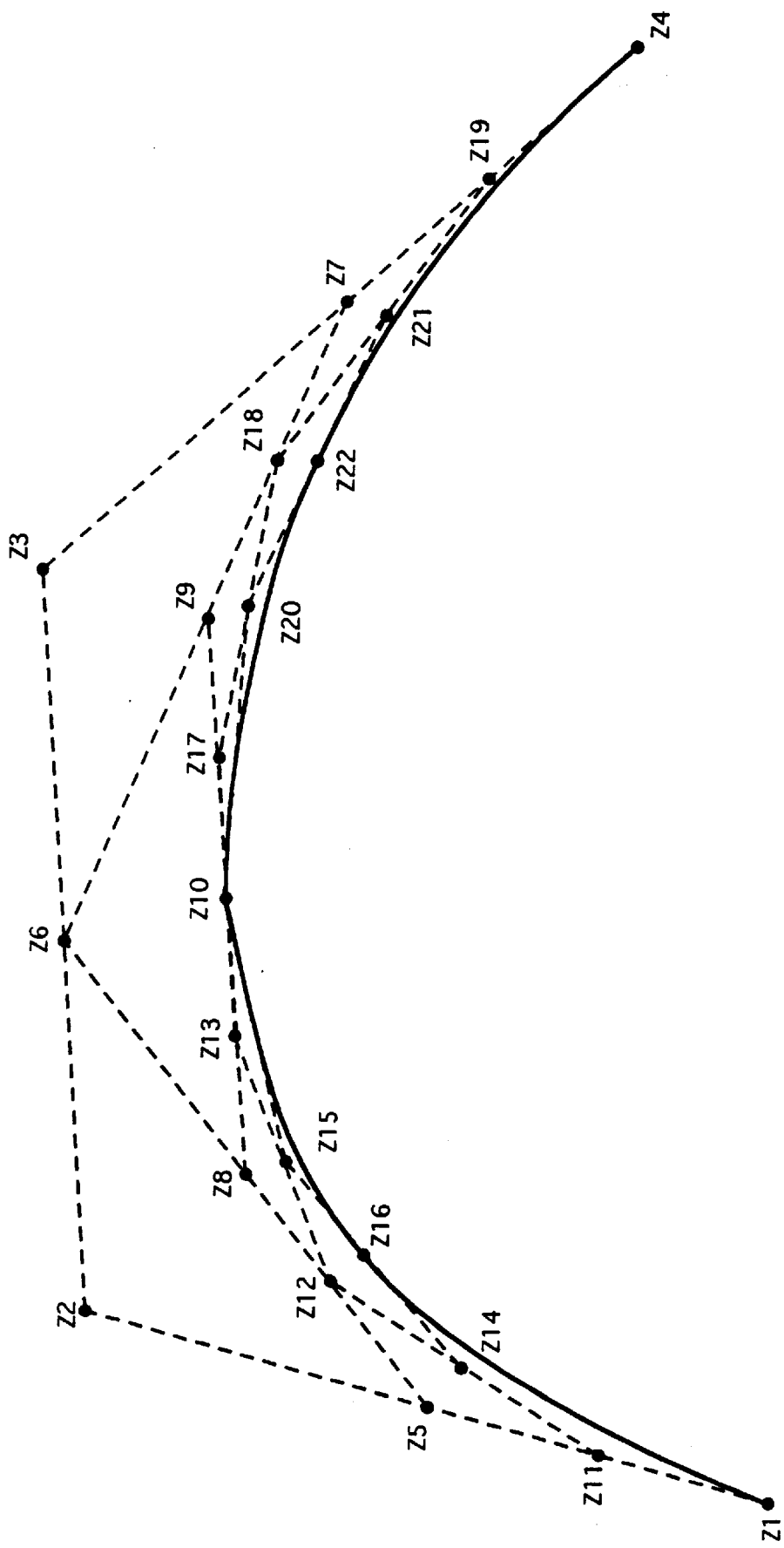
FIG. 18 is a diagram for explaining another approximate point specifying technique according to the recursive mid-point parting method.

The specifying manner will be explained with reference to FIG. 18 in which the four control points are indicated by Z1 to Z4, respectively. Firstly, mid points Z5, Z6 and Z7 are specified between the control points Z1 and Z2, between the control points Z2 and Z3, and between the control points Z3 and Z4, respectively. Secondly, mid points Z8 and Z9 are specified between the points Z5 and Z6 and between the points Z6 and Z7, respectively. Thirdly, mid point Z10 is specified between the points Z8 and Z9. The point Z10 is on the curved segment J defined by the four control points Z1 to Z4 and accordingly serves as one of the approximate points. Likewise, assuming that the points Z1, Z5, Z8 and Z10 are the four control points, mid points Z11, Z12 and Z13 are specified between the points Z1 and Z5, between the points Z5 and Z8, and between the points Z8 and Z10, respectively, and, subsequently, mid points 14 and 15 are specified between the points Z11 and Z12, and between the points Z12 and Z13. Between the mid points Z14 and Z15, is specified mid point Z16 which is on the curved segment J and serves as another one of approximate points. Assuming that the points Z1, Z11, Z14 and Z16 are the four control points, the above mid point specifying steps are repeated, thereby obtaining other approximate points closer to the point Z1 in turn. The repeating steps are stopped when K1/K2 is less than a predetermined value. Note that K1 is representative of a distance from mid point between two outer control points of the present control points to the approximate point first specified based on the present control points and K2 is representative of a distance from the mid point between the two outer control points to mid point between two inner control points of the present control points. Assuming that the points Z1, Z5, Z8 and Z10 is the four control points, K1 is representative of the distance from mid point between the points Z1 and Z8 to the approximate point Z16 and K2 is representative of the distance from the mid point between the points Z1 and Z8 to the point Z12. When the repetition of the point specifying steps is stopped, the approximate point closest to the point Z1 is specified. Assuming that the approximate point closest to the point Z1 is the first approximate point, the approximate points on the curved segment J specified through the foregoing manner are counted up in order.

Returning back to FIG. 17, in a step L5, the coordinates of the nth approximate point is substituted for a coordinate data set of the nth apex of the polygonal line of the polygonal line element structure. The step L5 is followed by the step L6 in which a determination is made on whether n=M or not.

If the answer in the step L6 is in the negative "NO", the step L6 proceeds to a step L7 to judge whether or not the approximate point specifying steps are completed. If the answer in the step L7 is in the negative "NO", the step L7 proceeds to a step L8 to replace n with n+1. The step L8 returns to the step L4. In this case, the steps L4 through L8 are repeated until n is equal to M in the step L6. The fact n=M means that the polygonal line element structure filling the reserved memory area have been formed. If, therefore, n=M in the step L6, the step L6 proceeds to a step L9 to substitute the address of the present polygonal line element structure for a pointer of the previous element structure and, accordingly, the present element structure is connected to the graphic path. In a step L10, a determination is made on whether or not the approximate point specifying step L10 is completed. If the answer in the step L10 is in the negative "NO", the step L10 returns to the step L2. If, on the other hand, the answer in the step L10 is in the affirmative "YES", the steps are brought to an end. The first and second polygonal line element structures formed through the step L10 are denoted by 40d and 40e in FIG. 19, respectively.

Figure 19:
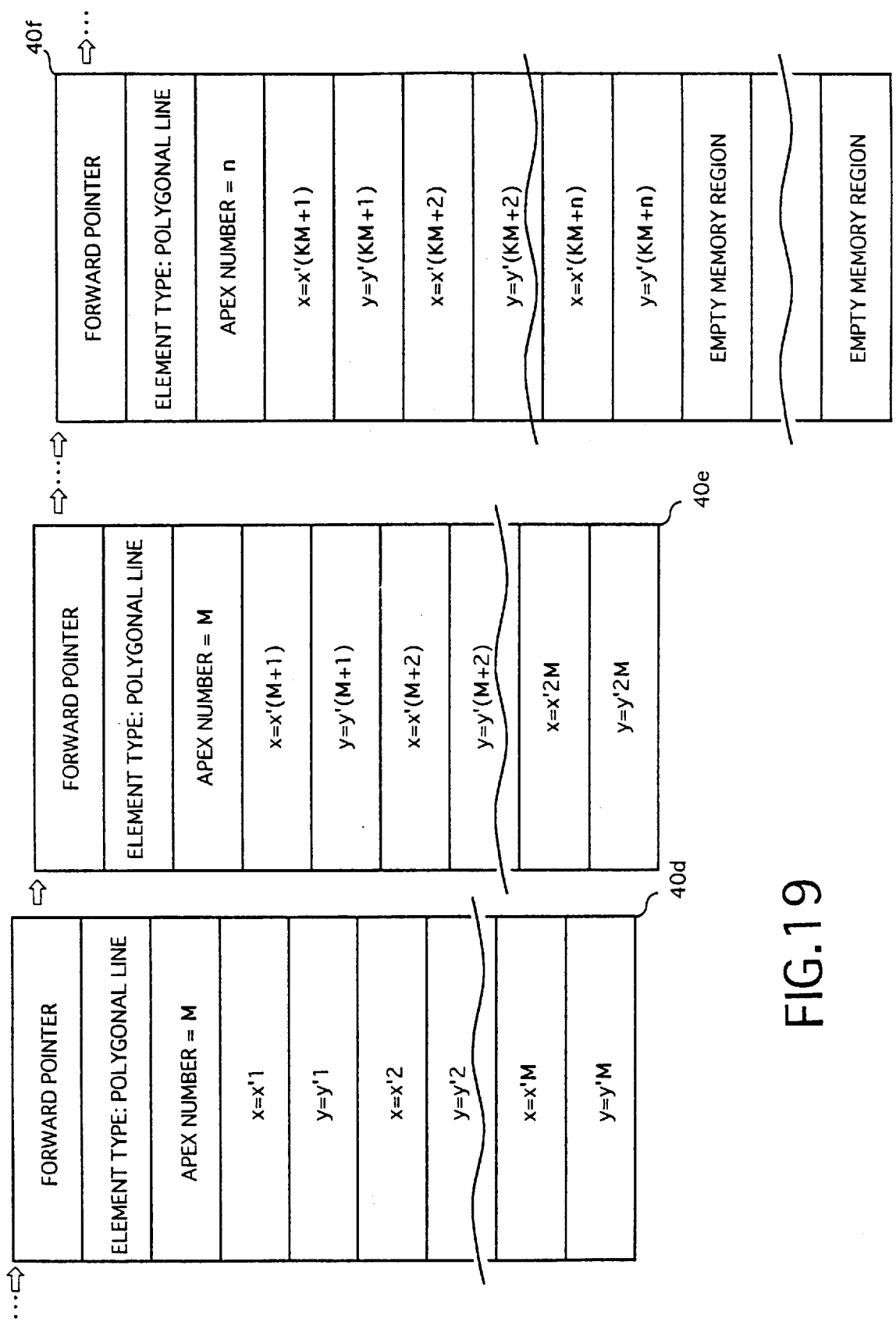
FIG. 19 is a schematic diagram illustrating polygonal line element structures formed through the steps shown in FIG. 17.

When, in the step L7, the approximate point specifying process have been completed, this means that the polygonal line element structure filling the reserved memory area have been formed. If, therefore, the answer in the step L7 is in the affirmative "YES", the step L7 proceeds to a step L11 to substitute n for the number of apexes of the present polygonal line element structure. In a step L12, the address of the present polygonal line element structure is substituted for a pointer of the previous element structure and, accordingly, the present element structure is connected to the graphic path, thereby bringing the steps to an end. The polygonal line element structure formed through the step L12 is denoted by 40f in FIG. 19. As shown in FIG. 19, there are empty memory regions in the memory area reserved for the polygonal line element structure 40f. The reason for this is that the polygonal line element structure 40f includes the coordinate data sets which are smaller in set number than M.

From the foregoing description and FIGS. 13 through 19 it will have been appreciated that the outline font data processing method and apparatus according to the present invention further present numerous advantages described below.

On the basis of the outline font data representative of the curved segment partly forming the outlines of the character, there is formed at least one polygonal line element structure which causes the drawing output device to approximately draw the curved segments as a polygonal line in an interrupted sequence. As a result, the present embodiment has an advantage over prior-art method and apparatus of reducing the number of memory area reservations for the element structures and saving the memory areas having the element structures stored therein. The reason for this is that, in the prior-art method and apparatus, the path constructing unit is required to form rectilinear segment element structures which is equal in number to numerous approximate points specified on the curved segment and accordingly to reserve numerous memory areas for the rectilinear segment element structures. For the same reason, the present embodiment has another advantage over the prior-art method and apparatus of reducing the total size of the memory areas storing therein element structures which define outline sections, respectively, including at least a curved segment. The present embodiment has a further advantage over prior-art method and apparatus and that is making the drawing operation quick and easy to use because of the fact that, the prior-art system must read out the numerous rectilinear segment element structures in order to approximately draw the curved segment, while the system of the present invention can approximately draw the curved segment by reading out one polygonal line element structure or a plurality of polygonal line element structures the number of which is greatly reduced compared to that of the rectilinear segment element structures of the prior-art system.

As shown in FIG. 19 and described hereinbefore, the polygonal line element structure 40d, 40e or 40f includes a pointer indicative of location of the following element structure, element type data indicating that the polygonal line element structure itself is of a polygonal line element type, apex number data indicative of the number of apexes of the polygonal line including an end point of the polygonal line, and a coordinate data set indicative of coordinates of the apexes in the drawing coordinate system. The element type data, apex number data, coordinate data set are easily determined on the basis of the operator of the curved segment drawing data group of the outline font dictionary, the number of the approximate points specified on the curved segment, the coordinates of the approximate points, respectively. This means that the path constructing unit 10 can make the most of the data arrangement of a conventional outline font dictionary and easily form the polygonal element structure. Also, the data construction of the polygonal line element structure becomes simple and compact and, for this reason, the memory area for storing the polygonal line element structure therein is reduced in memory size. Therefore, the drawing operation can be further improved in speed and ease of use.

The coordinate data set of the outline font dictionary is mapped onto the drawing coordinate system before the polygonal element structure is formed. The mapped coordinate data set is used as the coordinate data set of the polygonal element structure. Therefore, conventional processing steps from the outline font data reading step to the data mapping step can be utilized and a conventional outline font dictionary can be utilized as it is.

Figure 14:
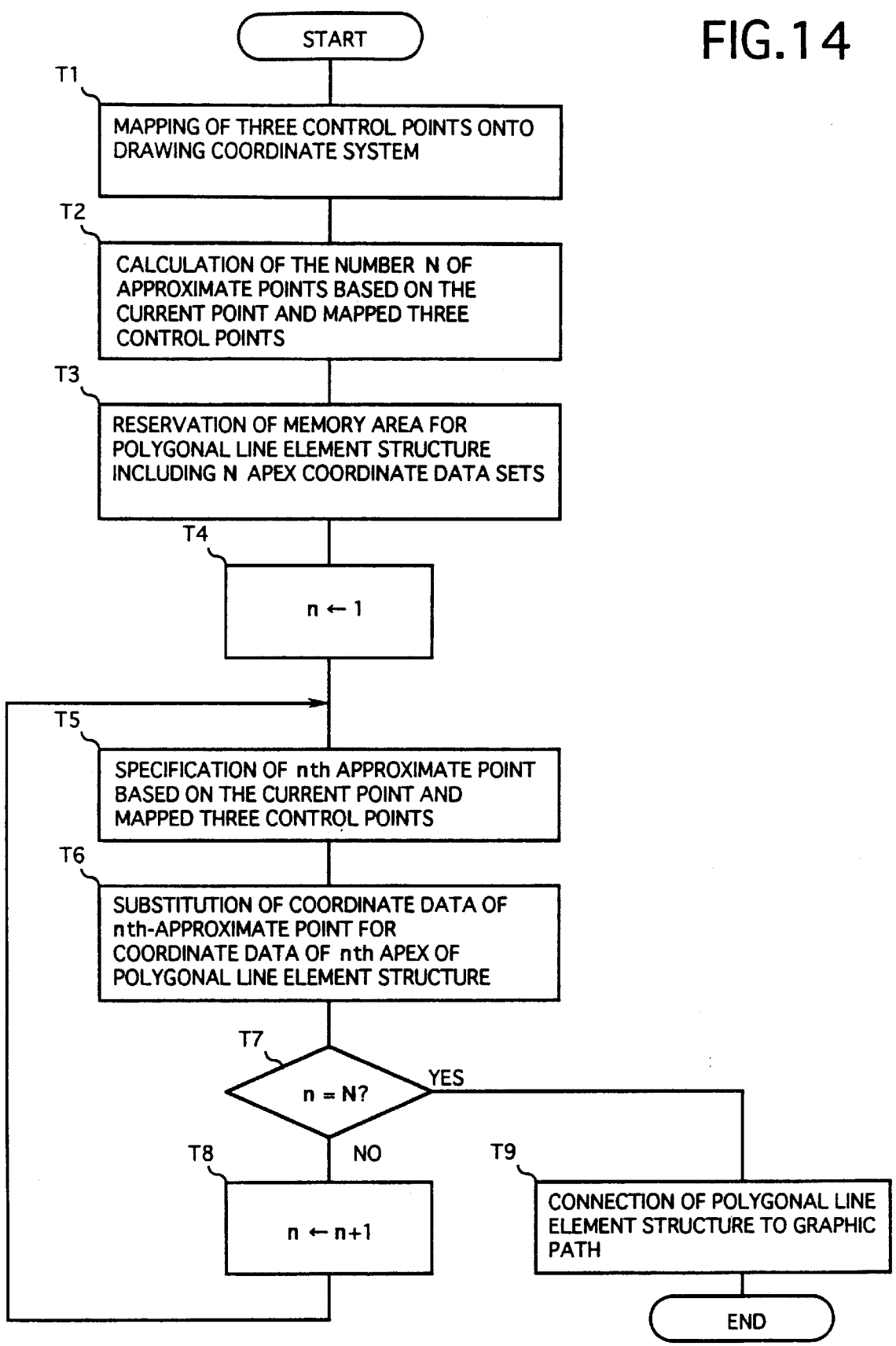
FIG. 14 is a flow chart illustrating in detail a curved segment drawing data processing step shown in FIG. 9 and adopting a forward difference method.

When the curved segment drawing data processing method which is shown as a flow chart in FIG. 14 is adopted, the number of the approximate points is calculated before the obtainment of the approximate points. In this instance, before the start of the polygonal line element structure forming step, the memory area can be reserved for the polygonal line element structure including the coordinate data sets, the number of which is equal to the calculated number of the approximate points. The method of the flow chart in FIG. 14 is effective in carrying out the foregoing forward difference method as the approximate point specifying method. In addition, the method of the flow chart in FIG. 14 can prevent the polygonal line element structure from overflowing the reserved memory area while the polygonal line element structure is being formed, thereby making it possible to draw the curved segment on the basis of only one polygonal line element structure.

Figure 17:
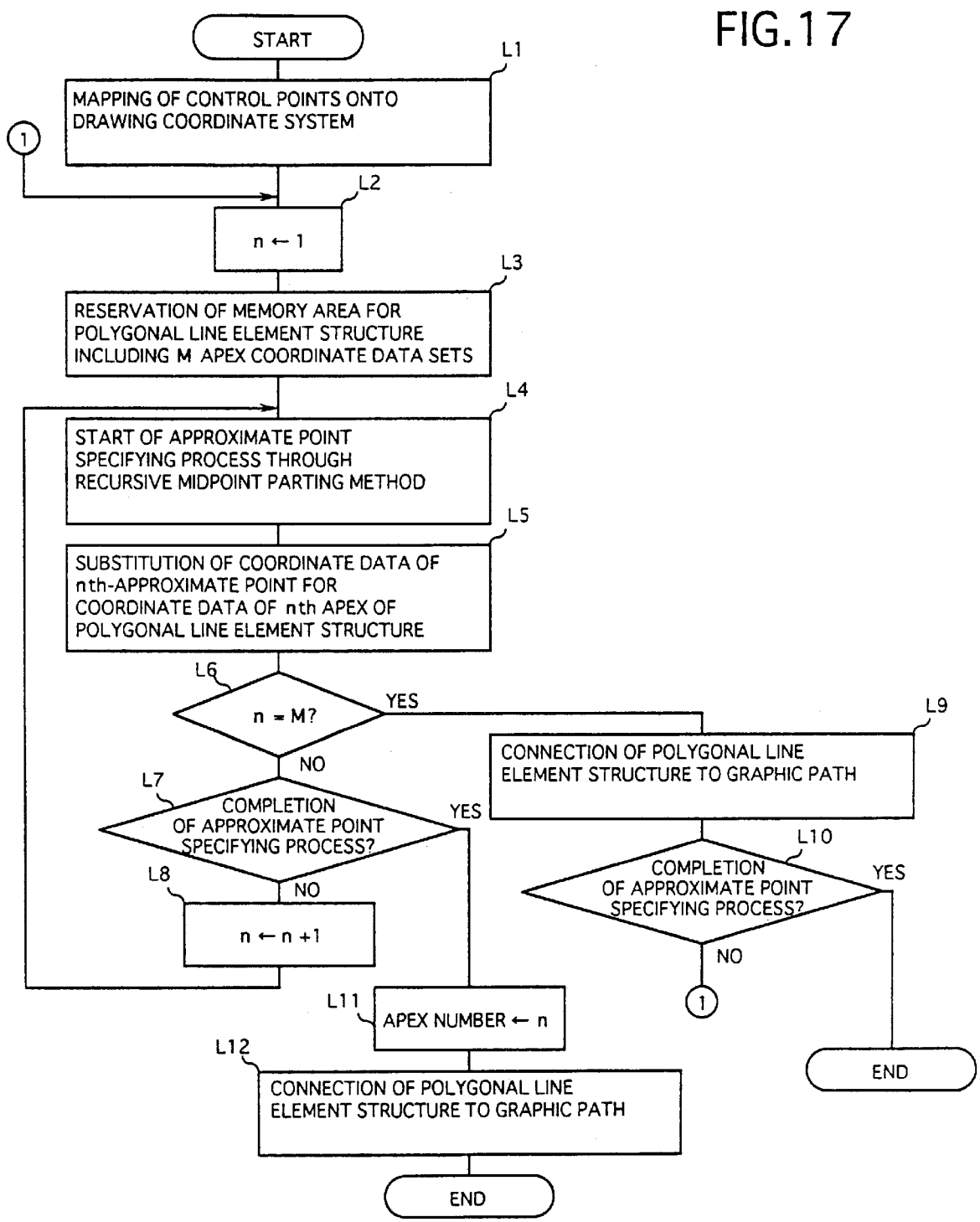
FIG. 17 is a flow chart illustrating in detail another curved segment drawing data processing step shown in FIG. 9 and adopting a recursive mid-point parting method.

When, on the other hand, the curved segment drawing data processing method which is shown in the flow chart of FIG. 17 is adopted, the number of the approximate points is not determined until all the approximate points are specified. Whenever the number of the approximate points attains the predetermined maximum permissible number, the memory area is reserved for the polygonal line element structure including coordinate data sets of the apexes of the number of which is equal to the predetermined maximum permissible number. As a result, the method shown in the flow chart of FIG. 17 has the advantage in preventing each of the polygonal line element structures from overflowing each of the reserved memory areas while the polygonal line element structures are being formed. In addition, the method is effective in carrying out the foregoing recursive mid-point parting method as the approximate point specifying method.

The path constructing unit 10 and the font drawing unit 50 are herein assumed and shown, by way of example, as be included in one processor but, if desired, may be included in two different processors, respectively. In the thus modified system, the path constructing unit 10 may be so constructed as to include an individual internal storage device in which the graphic path is constructed and stored and from which the graphic path is transferred through FIFO (First-in-First-out) to another storage device to be accessed by the font drawing unit 50.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly, all suitable modifications and equivalents may be resorted to, falling with the scope of the invention.

What is claimed is:

1. A method of processing outline font data contained in an outline font dictionary having a dictionary coordinate system, and indicative of outlines of characters drawn by a drawing output device having a drawing coordinate system, the outline font data including a coordinate data set indicative of coordinates of a destination point in the dictionary coordinate system, comprising:

reading out, from said outline font dictionary, the outline font data indicative of one of said characters; and constructing a graphic path covering the whole of the outlines of one of said characters by forming a plurality of element structures based on the outline font data read out from said outline font dictionary and by connecting said element structures together, each of the outlines indicated by the outline font data being divided into a plurality of outline sections, including judging whether each of said outline sections is a rectilinear segment or a curved segment;

forming, when the judging step determines that said outline section is a curved segment, from the outline font data indicative of continuous outline sections each forming a rectilinear segment, a curved segment based on a plurality of approximate points positioned on the curved segment, and drawing from said approximate points a polygonal line element structure, defined by coordinate data sets each indicative of coordinates of apexes in the drawing coordinate system, indicative of one of the continuous outline sections drawn as a polygonal line by said drawing output device;

mapping the coordinate data set of the outline font data onto the drawing coordinate system to form a mapped coordinate data set serving as one of ordinate style or relative coordinate style to form a coordinate data congregation array, after reserving a memory area for the coordinate data congregation array in a prepared storage, the memory area being capable of storing data corresponding in size to the coordinate data congregation array including the coordinate data sets the number of which is equal to a predetermined maximum permissible number, the coordinate data sets of the coordinate data congregation array being mapped in said mapping step, when the number of the continuous outline sections is less than or equal to a predetermined maximum permissible number, said unifying including forming and storing, in the reserved memory area, the coordinate data congregation array defining all the continuous outline sections; and when the number of the continuous outline sections exceeds said predetermined maximum permissible number, said unifying including dividing the continuous rectilinear segments into a plurality of segment groups each including the rectilinear segments the number of which is equal to or less than the predetermined maximum permissible number, repeating said reserving to reserve other memory areas until the number of the reserved memory areas attains the number of the segment groups, and repeating said forming and storing to form and store, in the reserved memory area, other coordinate data congregation arrays defining the segment groups, respectively; and connecting said polygonal line element structure to said graphic path.

2. A method as set forth in claim 1, in which said drawing output device has a drawing coordinate system, said polygonal line element structure comprising:

a pointer indicative of a location of the following element structure on said graphic path;

element type data indicating that the polygonal line element structure itself is of a polygonal line element type;

apex number data indicative of the number of apexes of said polygonal line including an end point of said polygonal line; and coordinate data sets each indicative of coordinates of each of said apexes in said drawing coordinate system.

3. A method as set forth in claim 2, in which said outline font dictionary has a dictionary coordinate system, the outline font data indicative of the rectilinear segment being constituted by a rectilinear segment drawing operator indicating that a drawing point provided for said dictionary coordinate system is moved on a straight line from a current point to a destination point in said dictionary coordinate system to draw the rectilinear segment, and a coordinate data set indicative of coordinates of the destination point in said dictionary coordinate system, said constructing step further including the step of mapping the coordinate data set of said outline font data onto said drawing coordinate system, and the mapped coordinate data set serving as one of the coordinate data sets of said polygonal line element structure.

4. A method as set forth in claim 3, in which the coordinates of the coordinate data set of said outline font data are defined by absolute coordinates or relative coordinates with respect to the current point in said dictionary coordinate system, said constructing step further including the step of unifying the coordinate data sets indicative of the continuous rectilinear segments into either absolute coordinate style or relative coordinate style to form a coordinate data congregation array from the unified coordinate data sets, and the coordinate data sets of said coordinate data congregation array being mapped in said mapping step.

5. A method as set forth in claim 3, in which said dictionary coordinate system is defined by x-axis and y-axis intersecting at a right angle and extending horizontally and vertically, respectively, the coordinates of the coordinate data set of said outline font data being defined by absolute coordinates or relative coordinates with respect to the current point in said dictionary coordinate system, when the rectilinear segment is a slantindicular rectilinear segment in said dictionary coordinate system, the rectilinear segment drawing operator being a slantindicular rectilinear segment drawing operator indicating that the drawing point is moved on a slanted straight line to draw the slantindicular rectilinear segment, the coordinate data set defining the slantindicular rectilinear segment being indicative of an x-coordinate and a y-coordinate of the destination point, when the rectilinear segment is a horizontal rectilinear segment in said dictionary coordinate system, the rectilinear segment drawing operator being a horizontal rectilinear segment drawing operator indicating the drawing point is horizontally moved on a straight line to draw the horizontal rectilinear segment, the coordinate data set defining the horizontal rectilinear segment being indicative of an x-coordinate of the destination point, when the rectilinear segment is a vertical rectilinear segment in said dictionary coordinate system, the rectilinear segment drawing operator being a vertical rectilinear segment drawing operator indicating the drawing point is vertically moved on a straight line to draw the vertical rectilinear segment, the coordinate data defining the vertical rectilinear segment being indicative of a y-coordinate of the destination point, said constructing step further including the step of unifying the coordinate data sets indicative of the continuous rectilinear segments into either absolute coordinate style or relative coordinate style and into a style of data including both x-coordinates and y-coordinates to form a coordinate data congregation array from the unified coordinate data sets, and the coordinate data sets of said coordinate data congregation array being mapped in said mapping step.

6. A method as set forth in claim 4, in which said unifying step includes the steps of reserving a memory area for the coordinate data congregation array on prepared storing means, said memory area being capable of storing data corresponding in size to the coordinate data congregation array including the coordinate data sets the number of which is equal to a predetermined maximum permissible number, when the number of the continuous rectilinear segments is less than or equal to said predetermined maximum permissible number, said unifying step further including the step of forming and storing, in the reserved memory area, the coordinate data congregation array defining all the continuous rectilinear segments, and when the number of the continuous rectilinear segments exceeds said predetermined maximum permissible number, said unifying step further including the steps of dividing the continuous rectilinear segments into a plurality of segment groups each including the rectilinear segments the number of which is equal to or less than said predetermined maximum permissible number, repeating said reserving step to reserve other memory areas until the number of the reserved memory areas attains the number of said segment groups, and repeating said forming and storing step to form and store, in the reserved memory areas, other coordinate data congregation arrays defining said segment groups, respectively.

7. A method of processing outline font data contained in an outline font dictionary and indicative of outlines of characters drawn by a drawing output device, comprising:

reading out, from said outline font dictionary, the outline font data indicative of one of said characters;

constructing a graphic path covering the whole of the outlines of said one of said characters by forming a plurality of polygonal line element structures based on the outline font data read out from said outline font dictionary;

reserving a memory area for the polygonal line element structure, said memory area being capable of storing data corresponding in size to the polygonal line element structure including coordinate data sets the number of which is equal to a predetermined maximum permissible number;

storing the polygonal line element structure in the reserved memory area when the number of the specified approximate points is less than or equal to said predetermined maximum permissible number;

connecting said element structures, each of the outlines indicated by the outline font data being divided into a plurality of outline sections;

judging whether each of said outline sections is a curved segment;

specifying a plurality of approximate points positioned on and approximately defining the curved segment;

forming, from the specified approximate points, a polygonal line element structure indicative of an outline section forming the curved segment approximately drawing as a polygonal line by said drawing output device, when the number of the approximate points exceeds said predetermined maximum permissible number, dividing the approximate points into a plurality of point groups each including the approximate points the number of which is equal to or less than said predetermined maximum permissible number, repeating said reserving step to reserve other memory areas until the number of the reserved memory areas attains the number of said point groups, repeating said forming step and storing step to form and store, in the reserved memory areas, other polygonal line element structures based on said point groups, respectively; and connecting said polygonal line element structure to said graphic path.

8. A method as set forth in claim 7, in which said drawing output device has a drawing coordinate system, said polygonal line element structure comprising:

a pointer indicative of a location of the following element structure on said graphic path;

element type data indicating that the polygonal line element structure itself is of a polygonal line element type;

apex number data indicative of the number of apexes of the polygonal line including an end point of the polygonal line; and coordinate data sets each indicative of coordinates of each of said apexes in said drawing coordinate system.

9. A method as set forth in claim 8, in which said outline font dictionary has a dictionary coordinate system, the outline font data indicative of the curved segment being constituted by a curved segment drawing operator indicating that a drawing point provided for said dictionary coordinate system is moved on a curved line from a current point to a destination point in said dictionary coordinate system to draw the curved segment, and coordinate data sets indicative of coordinates of control points defining the curved segment in cooperation with the current point in said dictionary coordinate system, one of said control points being the destination point, said constructing step further including the step of mapping the coordinate data sets of the outline font data defining the curved segment onto said drawing coordinate system, and said approximate points being specified on the basis of the mapped coordinate data sets in said specifying step.

10. A method as set forth in claim 7, in which said constructing step further includes the steps of:

calculating the number of said approximate points on the basis of the outline font data indicative of the curved segment prior to said specifying step; and reserving a memory area for the polygonal line element structure on prepared storing means prior to said forming step, said memory area being capable of storing data corresponding in size to the polygonal line element structure including the coordinate data set the number of which is equal to the calculated approximate point number; and storing the polygonal line element structure in the reserved memory area of said prepared storing means.

11. A method as set forth in claim 7, in which said constructing step further includes the steps of:

reserving memory area for the polygonal line element structure on prepared storing means, said memory area being capable of storing data corresponding in size to the polygonal line element structure including the coordinate data sets the number of which is equal to a predetermined maximum permissible number; and storing the polygonal line element structure in the reserved memory area of said prepared storing means when the number of the specified approximate points is less than or equal to said predetermined maximum permissible number, when the number of the approximate points exceeds said predetermined maximum permissible number, said constructing step further including the steps of:

dividing the approximate points into a plurality of point groups each including the approximate points the number of which is equal to or less than said predetermined maximum permissible number;

repeating said reserving step to reserve other memory areas until the number of the reserved memory areas attains the number of said point groups; and repeating said forming step and storing step to form and store, in the reserved memory areas, other polygonal line element structures based on said point groups, respectively.

12. An apparatus for processing outline font data contained in an outline font dictionary and indicative of outlines of characters drawn by a drawing output device having a drawing coordinate system, the outline font data having coordinate data sets with absolute coordinates or relative coordinates with respect to a current point in a dictionary coordinate system, comprising:

dictionary storing means for storing the outline font dictionary;

path constructing means for reading out, from said dictionary storing means, the outline font data indicative of one of said characters, and for constructing a graphic path covering the whole of the outlines of said one of said characters by forming a plurality of element structures based on the outline font data read out from said dictionary storing means and by connecting said element structures, each of the outlines indicated by the outline font data read being divided into a plurality of outline sections; and element structure storing means for having said formed and connected element structures stored therein, said path constructing means including:

judging means for judging whether each of said outline sections is a rectilinear segment;

forming means for forming, from the outline font data indicative of continuous outline sections each forming a rectilinear segment, a polygonal line element structure indicative of a continuous outline section drawing as a polygonal line by said drawing output device, the outline font data indicative of the rectilinear segment being constituted by a rectilinear segment drawing operator indicating that a drawing point provided for the dictionary coordinate system is moved on a straight line from the current point to a destination point in the dictionary coordinate system to draw the rectilinear segment, and a coordinate data set indicative of coordinates of the destination point in said dictionary coordinate system, connecting means for connecting said polygonal line element structure to said graphic path, the polygonal line element structure including coordinate data sets each indicative of coordinates of each of apexes in the drawing coordinate system;

mapping means for mapping the coordinate data set of the outline font data onto the drawing coordinate system, and the mapped coordinate data set serving as one of the coordinate data sets of the polygonal line element structure;

data unifying means for unifying the coordinate data sets coordinate data sets indicative of the continuous outline sections into either absolute coordinate style or relative coordinate style to form a coordinate data congregation array from the unified coordinate data sets, and the coordinate data sets of the coordinate data congregation array being mapped by said mapping means; and congregation array storing means for permitting the coordinate data congregation array to be stored therein, said data unifying means being operated to reserve a memory area for the coordinate data congregation array on said congregation array storing means, the memory area being capable of storing data corresponding in size to the coordinate data congregation array including the coordinate data sets the number of which is equal to a predetermined maximum permissible number, when the number of the continuous rectilinear segments is less than or equal to the predetermined maximum permissible number, said data unifying means being operated to store, in the reserved memory area, the coordinate data congregation array defining all the continuous outline sections, when the number of the continuous outline sections exceeds the predetermined maximum permissible number, said data unifying means being further operated to divided the continuous outline sections into a plurality of segment groups each including the continuous outline sections the number of which is divided into the segment groups, said data unifying means being further operated to repeatedly reserve other memory areas until the number of the reserved memory areas attains the number of the segment groups, and to repeatedly form and store, in the reserved memory areas, other coordinate data congregation arrays defining the segment groups, respectively.

13. An apparatus as set forth in claim 12, in which said drawing output device has a drawing coordinate system, said polygonal line element structure comprising:

a pointer indicative of a location of the following element structure on said graphic path;

element type data indicating that the polygonal line element structure itself is of a polygonal line element type;

apex number data indicative of the number of apexes of the polygonal line including an end point of the polygonal line; and coordinate data sets each indicative of coordinates of each of said apexes in said drawing coordinate system.

14. An apparatus as set forth in claim 13, in which said outline font dictionary has a dictionary coordinate system, the outline font data indicative of the rectilinear segment being constituted by a rectilinear segment drawing operator indicating that the drawing point provided for said dictionary coordinate system is moved on a straight line from a current point to a destination point in said dictionary coordinate system to draw a rectilinear segment, and a coordinate data set indicative of coordinates of the destination point in said dictionary coordinate system, said path constructing means further including mapping means for mapping the coordinate data set of said outline font data onto said drawing coordinate system, and the mapped coordinate data set serving as one of the coordinate data sets of said polygonal line element structure.

15. An apparatus as set forth in claim 14, in which the coordinates of the coordinate data set of said outline font data are defined by absolute coordinates or relative coordinates with respect to the current point in said dictionary coordinate system, said path constructing means further including data unifying means for unifying the coordinate data sets indicative of the continuous rectilinear segments into either absolute coordinate style or relative coordinate style to form a coordinate data congregation array from the unified coordinate data sets, and the coordinate data sets of said coordinate data congregation array being mapped by said mapping means.

16. An apparatus as set forth in claim 15, further comprising congregation array storing means for permitting said coordinate data congregation array to be stored therein, said data unifying means being operated to reserve a memory area for the coordinate data congregation array on said congregation array storing means, said memory area being capable of storing data corresponding in size to the coordinate data congregation array including the coordinate data sets the number of which is equal to a predetermined maximum permissible number, when the number of the continuous rectilinear segments is less than or equal to said predetermined maximum permissible number, said data unifying means being operated to store, in the reserved memory area, the coordinate data congregation array defining all the continuous rectilinear segments, when the number of the continuous rectilinear segments exceeds said predetermined maximum permissible number, said data unifying means being further operated to divide the continuous rectilinear segments into a plurality of segment groups each including the rectilinear segments the number of which is equal to or less than said predetermined maximum permissible number, when said continuous rectilinear segments are divided into the segment groups, said data unifying means being further operated to repeatedly reserve other memory areas until the number of the reserved memory areas attains the number of said segment groups, and to repeatedly form and store, in the reserved memory areas, other coordinate data congregation arrays defining said segment groups, respectively.

17. An apparatus as set forth in claim 14, in which said dictionary coordinate system is defined by x-axis and y-axis intersecting at a right angle and extending horizontally and vertically, respectively, the coordinates of the coordinate data set of said outline font data being defined by absolute coordinates or relative coordinates with respect to the current point in said dictionary coordinate system, when the rectilinear segment is a slantindicular rectilinear segment in said dictionary coordinate system, the rectilinear segment drawing operator being a slantindicular rectilinear segment drawing operator indicating that the drawing point is moved on a slanted straight line to draw the slantindicular rectilinear segment, the coordinate data set defining the slantindicular rectilinear segment being indicative of x-coordinate and y-coordinate of the destination point, when the rectilinear segment is a horizontal rectilinear segment in said dictionary coordinate system, the rectilinear segment drawing operator being a horizontal rectilinear segment drawing operator indicating the drawing point is horizontally moved on a straight line to draw the horizontal rectilinear segment, the coordinate data set defining the horizontal rectilinear segment being indicative of an x-coordinate of the destination point, when the rectilinear segment is a vertical rectilinear segment in said dictionary coordinate system, the rectilinear segment drawing operator being a vertical rectilinear segment drawing operator indicating the drawing point is vertically moved on a straight line to draw the vertical rectilinear segment, the coordinate data defining the vertical rectilinear segment being indicative of a y-coordinate of the destination point, said path constructing means further including unifying means for unifying the coordinate data sets indicative of the continuous rectilinear segments into either absolute coordinate style or relative coordinate style and into a style of data including both x-coordinates and y-coordinates to form a coordinate data congregation array from the unified coordinate data sets, and the coordinate data sets of said coordinate data congregation array being mapped by said mapping means.

18. An apparatus for processing outline font data contained in an outline font dictionary and indicative of outlines of characters drawn by a drawing output device, comprising:

dictionary storing means for having said outline font dictionary stored therein;

path constructing means for reading out, from said dictionary storing means, the outline font data indicative of one of said characters, and for constructing a graphic path covering the whole of the outlines of one of said characters by forming a plurality of element structures based on the outline font data read out from said dictionary storing means and by connecting said element structures, each of the outlines indicated by the read out outline font data being divided into a plurality of outline sections, said path constructing means including:

judging means for judging whether each of said outline sections is a curved segment;

specifying means for specifying a plurality of approximate points positioned on and approximately defining the curved segment;

forming means for forming, from the specified approximate points, a polygonal line element structure indicative of an outline section forming the curved segment approximately drawn as a polygonal line by said drawing output device; and connecting means for connecting said polygonal line element structure to said graphic path;

element structure storing means for having said formed and connected element structures stored therein; and reserving means for reserving memory area for the polygonal line element structure on prepared storing means, said memory area being capable of storing data corresponding in size to the polygonal line element structure including the coordinate data sets the number of which is equal to a predetermined maximum permissible number, the polygonal line element structure being formed and stored in the reserved memory area of said prepared storing means when the number of the specified approximate points is less than or equal to said predetermined maximum permissible number, when the number of approximate points exceeds said predetermined maximum permissible number, said path constructing means being operated to divide the approximate points into a plurality of point groups each including the approximate points the number of which is equal to or less than said predetermined maximum permissible number, said reserving means being repeatedly operated to reserve other memory areas until the number of the reserved memory areas attains the number of said point groups when the approximately points are divided into said point groups, and said forming means repeatedly operating to form and store, in the reserved memory areas, other polygonal line element structures based on said point groups, respectively, when said reserving means is repeatedly operated.

19. An apparatus as set forth in claim 18, in which said drawing output device has a drawing coordinate system, said polygonal line element structure comprising:

a pointer indicative of a location of the following element structure on said graphic path;

element type data indicating that the polygonal line element structure itself is of a polygonal line element type;

apex number data indicative of the number of apexes of the polygonal line including an end point of the polygonal line; and coordinate data sets each indicative of coordinates of each of said apexes in said drawing coordinate system.

20. An apparatus as set forth in claim 19, in which said outline font dictionary has a dictionary coordinate system, the outline font data indicative of the curved segment being constituted by a curved segment drawing operator indicating that a drawing point provided for said dictionary coordinate system is moved on a curved line from a current point to a destination point in said dictionary coordinate system to draw the curved segment, and coordinate data sets indicative of coordinates of control points defining the curved segment in cooperation with the current point in said dictionary coordinate system, one of said control points being the destination point, said path constructing means further including mapping means for mapping the coordinate data sets of the outline font data defining the curved segment onto said drawing coordinate system, and said approximate points being specified by said specifying means on the basis of the mapped coordinate data sets.

21. An apparatus as set forth in claim 18, in which said path constructing means further includes:

calculating means for calculating the number of said approximate points on the basis of the outline font data indicative of the curved segment before said approximate points are specified by said specifying means; and reserving means for reserving a memory area for the polygonal line element structure on said element structure storing means before the polygonal line element structure is formed by said forming means, said memory area being capable of storing data corresponding in size to the polygonal line element structure including the coordinate data set the number of which is equal to the calculated approximate point number, and the polygonal line element structure being formed and stored in the reserved memory area of said element structure storing means.

22. An apparatus as set forth in claim 18, in which said path constructing means further includes:

reserving means for reserving memory area for the polygonal line element structure on prepared storing means, said memory area being capable of storing data corresponding in size to the polygonal line element structure including the coordinate data sets the number of which is equal to a predetermined maximum permissible number, the polygonal line element structure being formed and stored in the reserved memory area of said prepared storing means when the number of the specified approximate points is less than or equal to said predetermined maximum permissible number, when the number of the approximate points exceeds said predetermined maximum permissible number, said path constructing means being operated to divide the approximate points into a plurality of point groups each including the approximate points the number of which is equal to or less than said predetermined maximum permissible number, said reserving means being repeatedly operated to reserve other memory areas until the number of the reserved memory areas attains the number of said point groups when the approximate points are divided into said point groups, and said forming means repeatedly operating to form and store, in the reserved memory areas, other polygonal line element structures based on said point groups, respectively, when said reserving means is repeatedly operated.

23. A method of processing outline font data contained in an outline font dictionary and indicative of outlines of characters drawn by a drawing output device, comprising:

reading out, from said outline font dictionary, the outline font data indicative of one of said characters;

constructing a graphic path covering the whole of the outlines of one of said characters by forming a plurality of element structures based on the outline font data read out from said outline font dictionary and by connecting said element structures together, each of the outlines indicated by the outline font data being divided into a plurality of outline sections, including:

judging whether each of said outline sections is a rectilinear segment or a curved segment;

forming, when the judging step determines that said outline section is a curved segment, from the outline font data indicative of the continuous outline sections each forming a rectilinear segment, a curved segment based on a plurality of approximate points positioned on the curved segment, and drawing from said approximate points a polygonal line element structure indicative of a continuous outline section drawn as a polygonal line by said drawing output device; and connecting said polygonal line element structure to said graphic path.

* * * * *